United States Patent
Paternostro et al.

(10) Patent No.: US 9,886,244 B2
(45) Date of Patent: Feb. 6, 2018

(54) RICH TOOLING FOR REST APPLICATION DEVELOPMENT

(71) Applicant: Oracle International Corporation, Redwood Shores, CA (US)

(72) Inventors: Luiz Marcelo Aucelio Paternostro, Vaughan (CA); Raghunathan Srinivasan, Fremont, CA (US); Christopher Ray Stodden, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/872,381

(22) Filed: Oct. 1, 2015

(65) Prior Publication Data
US 2016/0098254 A1    Apr. 7, 2016

Related U.S. Application Data
(60) Provisional application No. 62/058,428, filed on Oct. 1, 2014.

(51) Int. Cl.
G06F 9/44    (2006.01)
G06F 9/445   (2006.01)

(52) U.S. Cl.
CPC ............ *G06F 8/35* (2013.01); *G06F 8/10* (2013.01); *G06F 8/30* (2013.01); *G06F 9/44589* (2013.01)

(58) Field of Classification Search
CPC ........... G06F 9/44589; G06F 8/34; G06F 8/30
USPC ................. 717/105, 118, 104, 106
See application file for complete search history.

(56) References Cited

U.S. PATENT DOCUMENTS

| | | | |
|---|---|---|---|
| 8,577,914 B2 * | 11/2013 | Hossain | G06F 17/30864 707/769 |
| 9,122,770 B2 * | 9/2015 | Murphy | G06F 8/20 |
| 2010/0077461 A1 * | 3/2010 | Nguyen | G06F 21/41 726/5 |
| 2014/0040863 A1 * | 2/2014 | Hale | G06F 8/73 717/123 |
| 2014/0156726 A1 * | 6/2014 | Bohlmann | H04L 69/18 709/203 |

OTHER PUBLICATIONS

Alkstein, "Learn REST: A Tutorial", 2008.*
Jerome B. Heiser, "RESTful Collaborative Modeling", 2013.*
Ejaz Ui Haq, "Tool Integration using OSLC", 2013.*
Koushik Maddipudi, "Efficient Architectures for Retrieving Mixed Data with Rest Architecture Style and HTML5 Support", 2013.*
Xun Xu, "From cloud computing to cloud manufacturing", 2011.*
Mayer et al., "Facilitating the Integration and Interaction of Real-World Services for the Web of Things", 2010.*

* cited by examiner

*Primary Examiner* — Phillip H Nguyen
(74) *Attorney, Agent, or Firm* — Kilpatrick Townsend & Stockton LLP

(57) ABSTRACT

Rich tooling is provided for REST application development that integrates the exploration of a REST API, modeling of data types and the REST API, and the generation of artifacts using the modeled REST API and data types.

19 Claims, 24 Drawing Sheets

FIG. 4

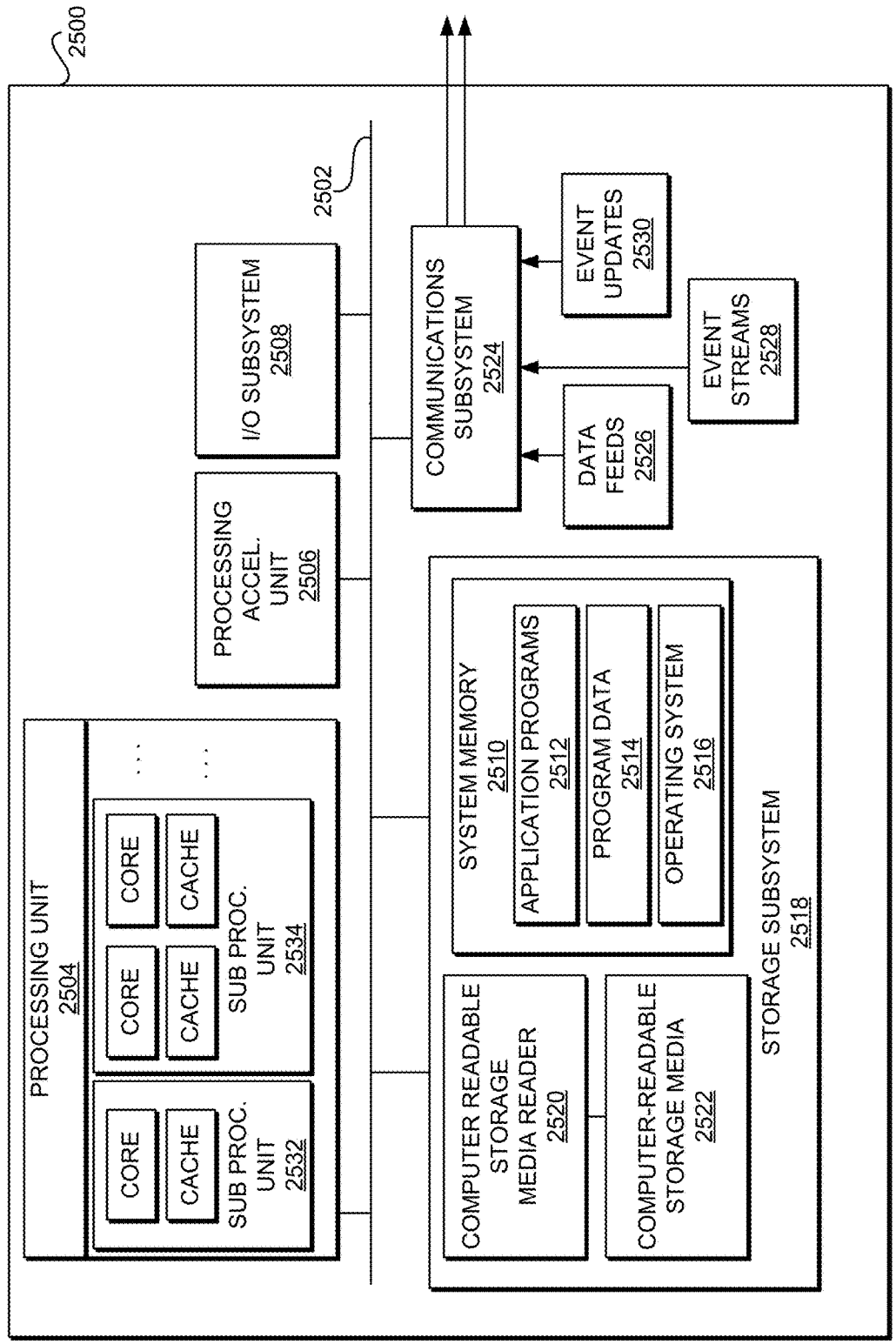

RICH TOOLING FOR REST APPLICATION DEVELOPMENT

CROSS-REFERENCE TO RELATED APPLICATIONS

This application claims the benefit of and priority to U.S. Patent Application No. 62/058,428, filed Oct. 1, 2014 and entitled "RICH TOOLING FOR REST APPLICATION DEVELOPMENT," the entire disclosure of which is hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use Application Development Frameworks (ADFs) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

In general, an ADF simplifies development of applications by providing re-usable components and integrated development environments, which application developers can use to define user interfaces and application logic by, for example, selecting components to perform desired tasks and defining the appearance, behavior, and interactions of the selected components. Some ADFs are based on a model-view-controller design pattern that promotes loose coupling and easier application development and maintenance. Oracle Application Development Framework is one example of an ADF that utilizes this design pattern.

Oracle ADF includes libraries of standards-based Java Server Faces (JSF) components with built-in HTML5 and Ajax functionality. With these components, web deployed user interfaces can be developed with a level of functionality and interactivity previously reserved for thick-client applications. The components offer data interaction, data visualization, and encapsulated browser side operations in a set of easy to use components that makes rich client application development easier than ever. Oracle ADF further provides a data-binding framework that simplifies binding UI to business services through a simple drag and drop operations in the IDE. This is done while still keeping the independence of the business service from consuming interfaces. With the framework, the UI developer is insulated from the underlying implementation of the business service layer. This makes the process of building the UI truly decoupled from the implementation of the business service layer, better positioning the application for implementation in a service-oriented architecture.

Accordingly, what is desired is to solve problems relating to developing application that utilized REST APIs, some of which may be discussed herein. Additionally, what is desired is to reduce drawbacks relating to developing application that utilized REST APIs, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Rich tooling is provided for REST application development that integrates the exploration of a REST API, modeling of data types and the REST API, and the generation of artifacts using the modeled REST API and data types.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 4 is an illustration of a user interface that may be presented by a tool of the integrated development environment of FIG. 2.

FIG. 25 illustrates an exemplary computer system, in which various embodiments of the present invention may be implemented.

DETAILED DESCRIPTION OF THE INVENTION

Figure 1:
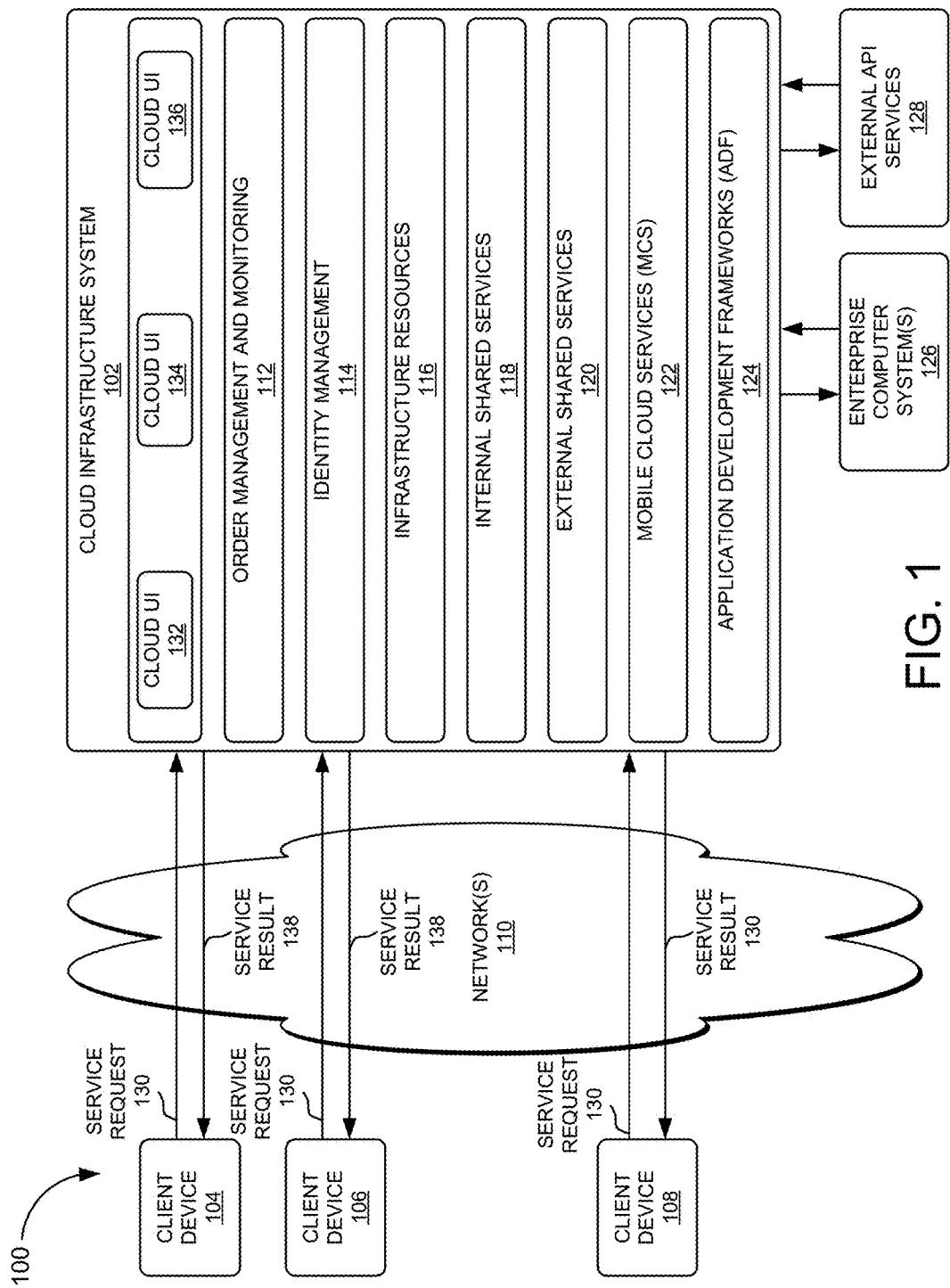
FIG. 1 is a simplified block diagram of components of a system environment by which services provided by the components of an embodiment system may be offered as mobile cloud services, in accordance with an embodiment of the present disclosure.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

Introduction

FIG. 1 is a simplified block diagram of one or more components of system environment 100 by which services provided by one or more components of an embodiment system may be offered as cloud services, in accordance with an embodiment of the present disclosure. In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a web browser, a proprietary client application (e.g., Oracle Forms), or some other application, which may be used by a user of the client computing device to interact with cloud infrastructure system 102 to use services provided by cloud infrastructure system 102.

It should be appreciated that cloud infrastructure system 102 depicted in FIG. 1 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 104, 106, and 108 can be general purpose personal computers including, by way of example, personal computers and/or laptop computers running various versions of Microsoft Windows®, Apple Macintosh®, and/or Linux operating systems. Client computing devices 104, 106, and 108 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc. may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an operating system including any of those discussed above, as well as any commercially available server operating system. One or more computer systems or servers associated with cloud infrastructure system 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a web service-based hosted relational database and a script-language middleware engine for private use by a networked developer. As another example, a service instance instantiated by cloud infrastructure 102 can include access to an email software application hosted on a cloud vendor's web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is the Oracle Public Cloud provided by the present assignee.

Cloud infrastructure system 102 may provide the cloud services via different deployment models. For example, services may be provided under a public cloud model in which cloud infrastructure system 102 is owned by an organization selling cloud services (e.g., owned by Oracle) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 102 may include, without limitation, application services, platform services and infrastructure services. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 102, and the like. In various embodiments, cloud infrastructure system 102 may be adapted to automatically provision, manage, and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, as depicted in FIG. 1, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud User Interface (UI), cloud UI 132, cloud UI 134, and/or cloud UI 138 and place a subscription order via these UIs. The order information received by cloud infrastructure system 102 in response to the customer placing an order may include information identifying the customer and information identifying one or more services offered by the cloud infrastructure system 102 to which the customer intends to subscribe.

After an order has been placed by the customer, the order information is received via the cloud UIs, 132, 134, and/or 138.

In this example, order management and monitoring module 114 sends information received from a customer to an order database to have the order placed by the customer stored in recorded. The order database can be one of several databases operated by cloud infrastructure system 102 and operated in conjunction with other system elements. Order management and monitoring module 114 may forward information that includes all or part of the order information stored in the order database to an order management module. In some instances, the order management module may be configured to perform billing and accounting functions related to the order, such as verifying the order, and upon verification, booking the order.

Order management and monitoring module 114 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order-provisioning module.

In certain embodiments, the order orchestration module enables the management of business processes associated with each order and applies business logic to determine whether an order should proceed to provisioning. Upon receiving an order for a new subscription, the order orchestration module sends a request to the order-provisioning module to allocate resources and configure those resources needed to fulfill the subscription order. The order-provisioning module enables the allocation of resources for the services ordered by the customer. The order-provisioning module provides a level of abstraction between the cloud services provided by cloud infrastructure system 102 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 114 manages and tracks a customer's subscription order. In some instances, order management and monitoring module 114 may receive information indicative of any provisioned services and/or resources associated with the customer. Order management and monitoring module 114 may be configured to collect usage statistics for the services in the subscription order, such as the amount of storage used, the amount data transferred, the number of users, and the amount of system up time and system down time.

Once services and resources are provisioned in the above example, service result 138 may be sent to customers on client computing devices 104, 106, and/or 108 informing the customer of the provided services and/or resources. In instances where service request 130 includes a request to access a service or have a service perform one or more operations, service result 138 may be send to customers on client computing devices 104, 106, and/or 108 providing the requested access or results of any operations, services performed, or data requested.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface (API) services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by mobile cloud service (MSC) 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MSC 1112 may include an agent system to handle communication with enterprise computer systems 126.

A protocol may include a communication protocol, such as SPDY. A protocol may include an application protocol such as an HTTP-based protocol. In some embodiments, enterprise computer systems 126 may communicate with cloud infrastructure system 102 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 126 and cloud infrastructure system 102 may communicate using other protocols such as remote procedure calls (RPC) (e.g., XML RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific user interfaces to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an application programming interface (API). Callable interfaces associated with MCS 122 may enable an app on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom app to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 124 in cloud infrastructure system 102. ADFs 124 provide the infrastructure code to implement agile SOA based applications. ADFs 124 further provide a visual and declarative approach to development through one or more development tools (e.g., Oracle JDeveloper 11g development tool). One or more frameworks provided by ADFs 124 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 124 provide tools and resources allowing developers to create an application in the form of multiple layers, each layer containing code modules/files implementing desired logic according to pre-defined specification. Thus, in one embodiment, ADFS 124 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. EJB, Web Services, JavaBeans, JPA/EclipseLink/TopLink objects, and many others can all be used as Business Services for ADFs 124. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Rich Tooling for Rest Application Development

Figure 2:
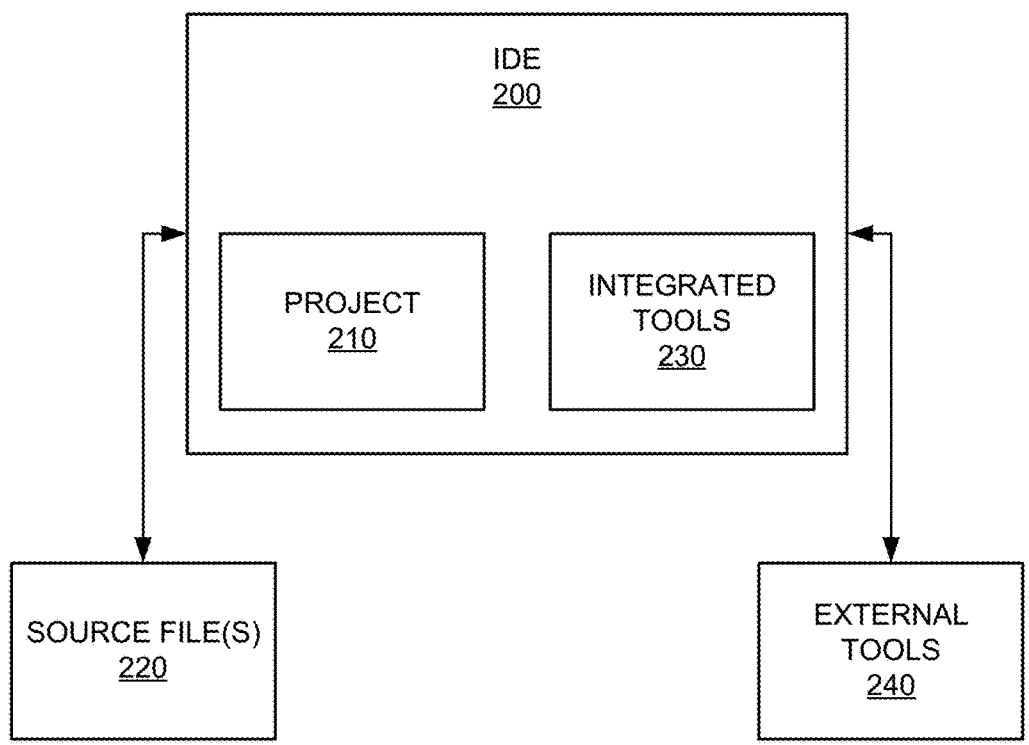
FIG. 2 is a block diagram of an integrated development environment having rich tooling for REST application development in one embodiment.

FIG. 2 is a block diagram of integrated development environment 200 having rich tooling for REST application development in one embodiment. In general, integrated development environment (IDE) 200 is a software application that provides comprehensive facilities to computer programmers for software development. Some examples of IDS 200 are Net Beans, Eclipse, SharpDevelop, and Lazarus.

IDE 200 can consist of a source code editor, build automation tools and a debugger. IDE 200 may offer intelligent code completion or other features. IDE 200 may contain a compiler, interpreter, or both. IDE 200 may include or interface with a version control system. In this example, IDE 200 is used to create project 210. Project 210 may be used as a container for accessing source file(s) 220. Project 210 may aggregate code, user interface specifications, and other information required for a particular development project.

Various tools may integrate with IDE 200 to simplify the construction of a source code file, a project, an application, a GUI, or the like. IDE 200 may include a class browser, an object browser, and a class hierarchy diagram, for use in object-oriented software development. As represented in FIG. 2, IDE 200 includes integrated tools 230 and interacts with external tools 240.

In certain embodiments, IDE 200 may be used for REST application development. REST (Representation State Transfer) refers to a stateless client/server architecture where the web services are viewed as resources that can be identified by their Uniform Resource Identifiers (URIs). These services are limited to the standard GET, POST, PUT, and DELETE HTTP methods. Software developed using this architecture is considered to be RESTful. REST APIs are typically programming language independent. They are accessible from any language that has a HTTP client library, including Java, Python, Perl, and so on.

In its basic form, a REST API is a URI that can perform a single operation. Resources are objects or actions that are addressable via a URI. A resource can return information according to a variety of Multi-Purpose Internet Mail Extensions (MIME) types. MIME is an extension of the original Internet e-mail protocol that lets people use the protocol to exchange different kinds of data file on the Internet: audio, video, images, application programs, and other kinds, as well as the ASCII text handled in the original protocol, the Simple Mail Transfer Protocol (SMTP). Servers can insert a MIME header at the beginning of a web transmission. Clients can use this header to select an appropriate "player" application for the type of data the header indicates. Although MIME was designed mainly for SMTP protocol, its use today has grown beyond describing the content of email and now often includes descriptions of content type in general, including for the web (see Internet media type) and as a storage for rich content in some commercial products (e.g., IBM Lotus Domino and IBM Lotus Quickr). JSON (Java Script Object Notation) is quickly become a popular format for REST resources. It is a lightweight interchange format which is easy to read and write for both humans and software.

Figure 3:
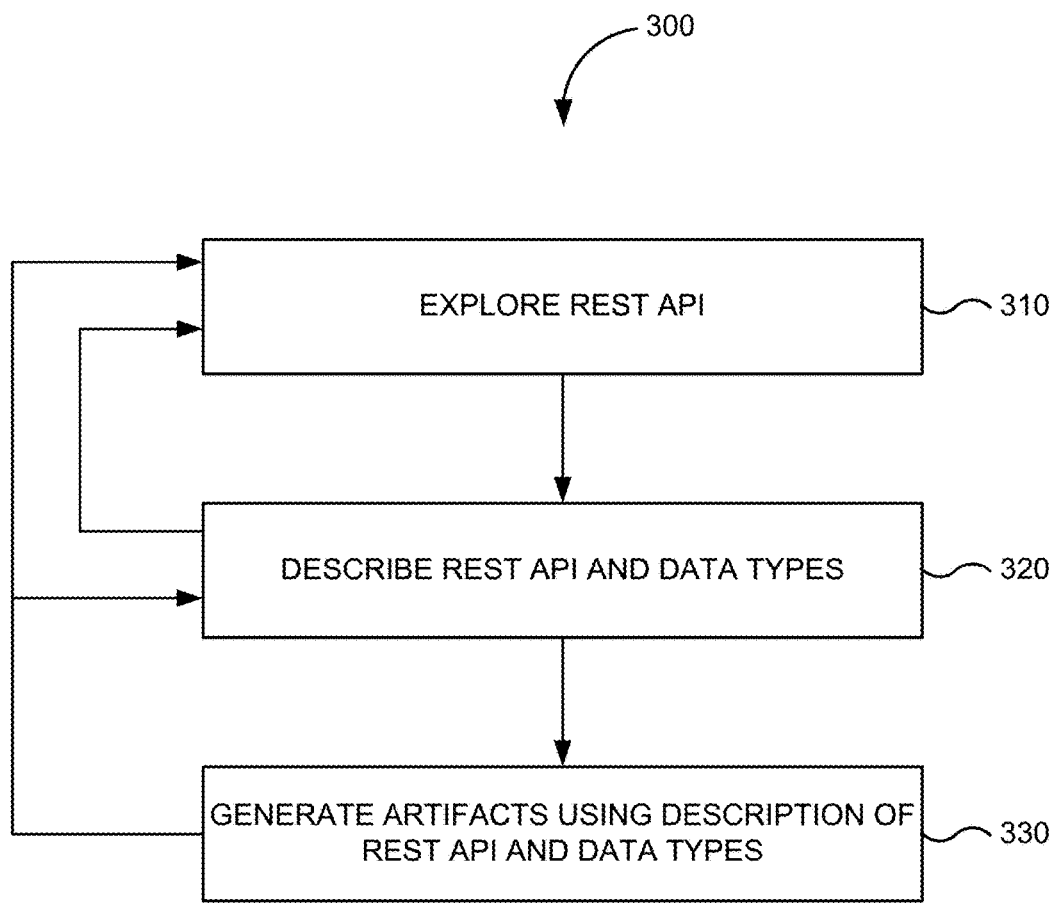
FIG. 3 is a flowchart of a method for REST application development in one embodiment.

FIG. 3 is a flowchart of method 300 for REST application development in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 310, a REST API is explored. Exploring a REST API generating includes constructing a request, sending the request to a resource, and analyzing any response. This can be a process requiring several iterations before a developer understands how the resource works and how the resource can be utilized within an application. Although some publishes of REST APIs provide documentation on how to access resources, such documentation may not be provide the insight required by the developer for a particular application. Thus, the developer resorts to tools to explore and understand REST resources. A variety of tools are available that assist a developer in constructing a request and analyzing a response. Most commonly, these tools reside in individual application and a developer is required to switch back and forth between features of individual applications in order to obtain a desired level of understanding of the REST API.

However, as of yet, existing tools fail to be integrated in such a way to centralize and facilitate the REST API exploration, REST API modeling, and REST API artifact generation in REST application development. In certain embodiments, a development tool provides functions for exploring, testing, and debugging how a REST resource is accessed. The REST resource and any data types can be described in step 320 using the same tool. In various embodiments, IDE 200 provides an integrated tool that facilitates REST API exploration, REST API modeling, and REST API artifact generation of artifacts, such as a code or documentation based on how the developer modeled the REST API. As shown in FIG. 3, in step 330, artifacts are generated using a description of a REST API and any data types.

Method 300 of FIG. 3 illustrates that such a tool allows a developer to iterate not only through each individual stage REST API exploration, REST API modeling, and REST API artifact generation, but also to jump back and forth between stages as need requires. This provides greater flexibility and agility in the development process.

FIG. 4 is an illustration of user interface 300 that may be presented by a tool of the integrated development environment of FIG. 2. In this example, a developer can specify a request method (such as GET, POST, PUT, DELETE, etc.) and a URL. The URL is composed of a URI for a REST resource. For example, the developer may be accessing a REST resource that provides a list of people in a contacts database. Each person is associated with an ID and a telephone number. Each telephone number has number attribute for which its value is the telephone number of the associated individual.

A request can be constructed using user interface 400 and sent to the REST resource. Any response received from the REST resource can be displayed or otherwise rendered in proximity to where the request was constructed in order to provide the developer with a holistic view of how to access the REST resource. In this example, the response has a header section (which typically defines the MIME type of any payload) and a body or payload section. A variety of options are provided to render the body of the response, such as in plain text or rendered according to its corresponding MIME type. For example, a string associated with an application/json MIME type can be rendered as a JSON object.

Figure 5:
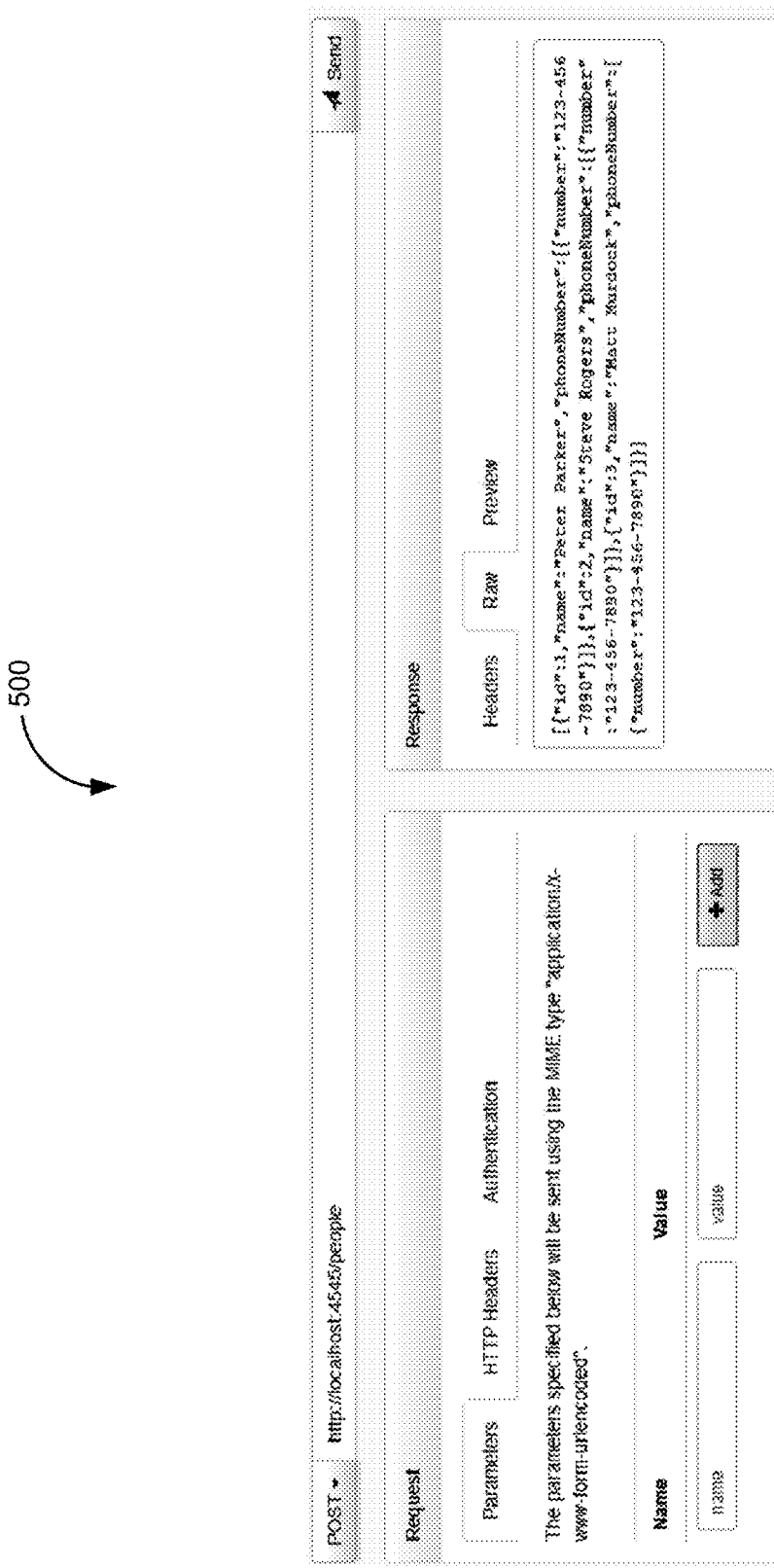
FIG. 5 is an illustration of a user interface that may be presented by a tool of the integrated development environment of FIG. 2 having a parameter-based body specification component.

FIG. 5 is an illustration of user interface 500 that may be presented by a tool of the integrated development environment of FIG. 2 having a parameter-based body specification component. In this example, parameters of a REST request can be specified in as a set of parameters or attribute-value pairs.

Figure 6:
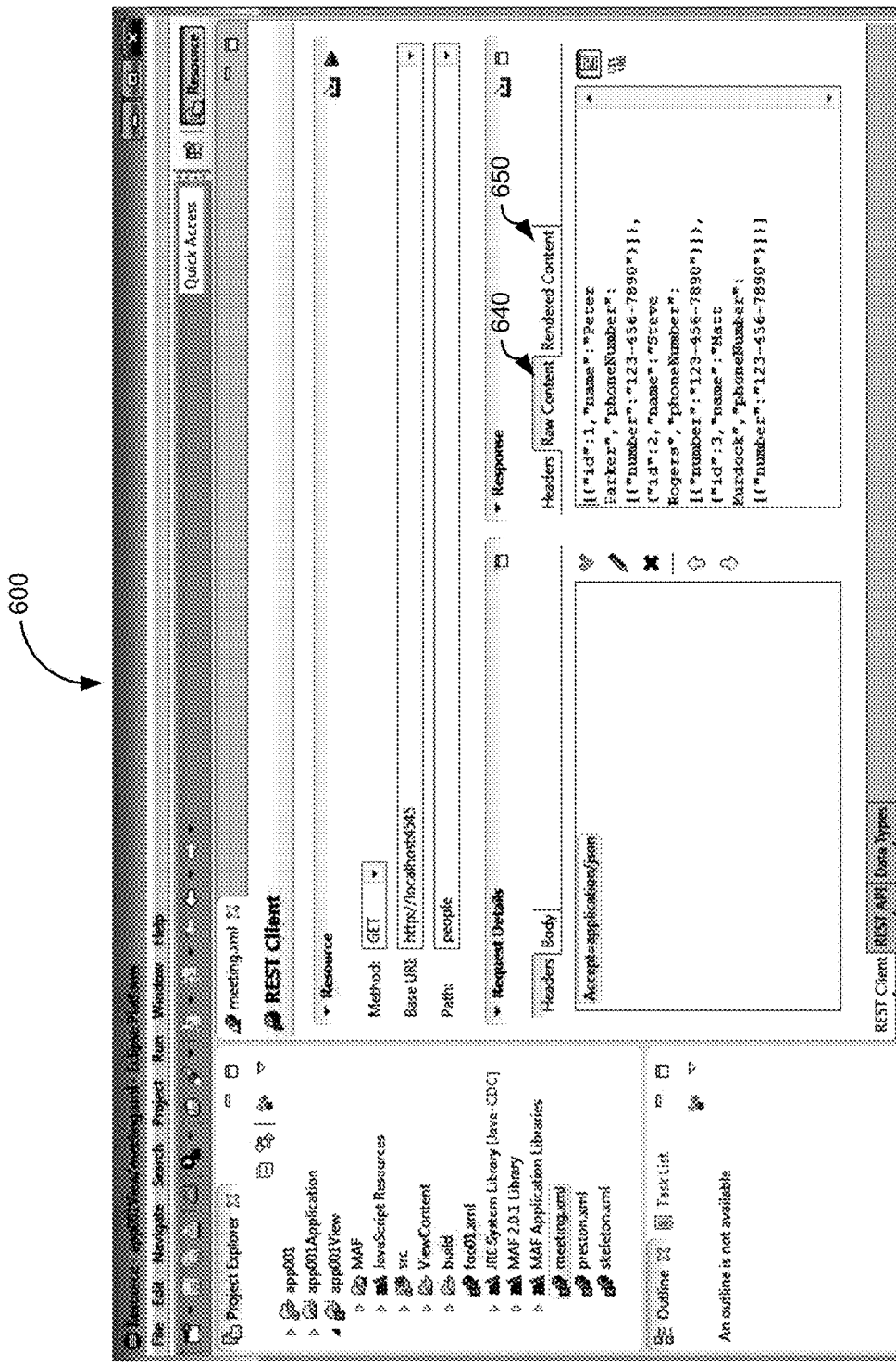
FIG. 6 is an illustration of a user interface that may be presented by a tool of the integrated development environment of FIG. 2 having a combination of a free text body specification component and a parameter-based body specification component in one embodiment.

FIG. 6 is an illustration of user interface 600 that may be presented by a tool of the integrated development environment of FIG. 2 having a combination of a free text body specification component and a parameter-based body specification component in one embodiment. In this example, user interface 600 includes UI 610 for a REST client function, UI 620 for a REST API modeling function, and UI 630 for a data type specification function.

UI 610 for a REST client function allows a developer to explore a REST API by constructing requests and analyzing response. UI 620 for a REST API modeling function allows a developer to model the results of exploring the REST API using UI 610. UI 630 for a data type specification function allows a developer to construct and define data types applicable to an application under development from the results of exploring the REST API using UI 610.

Figure 7:
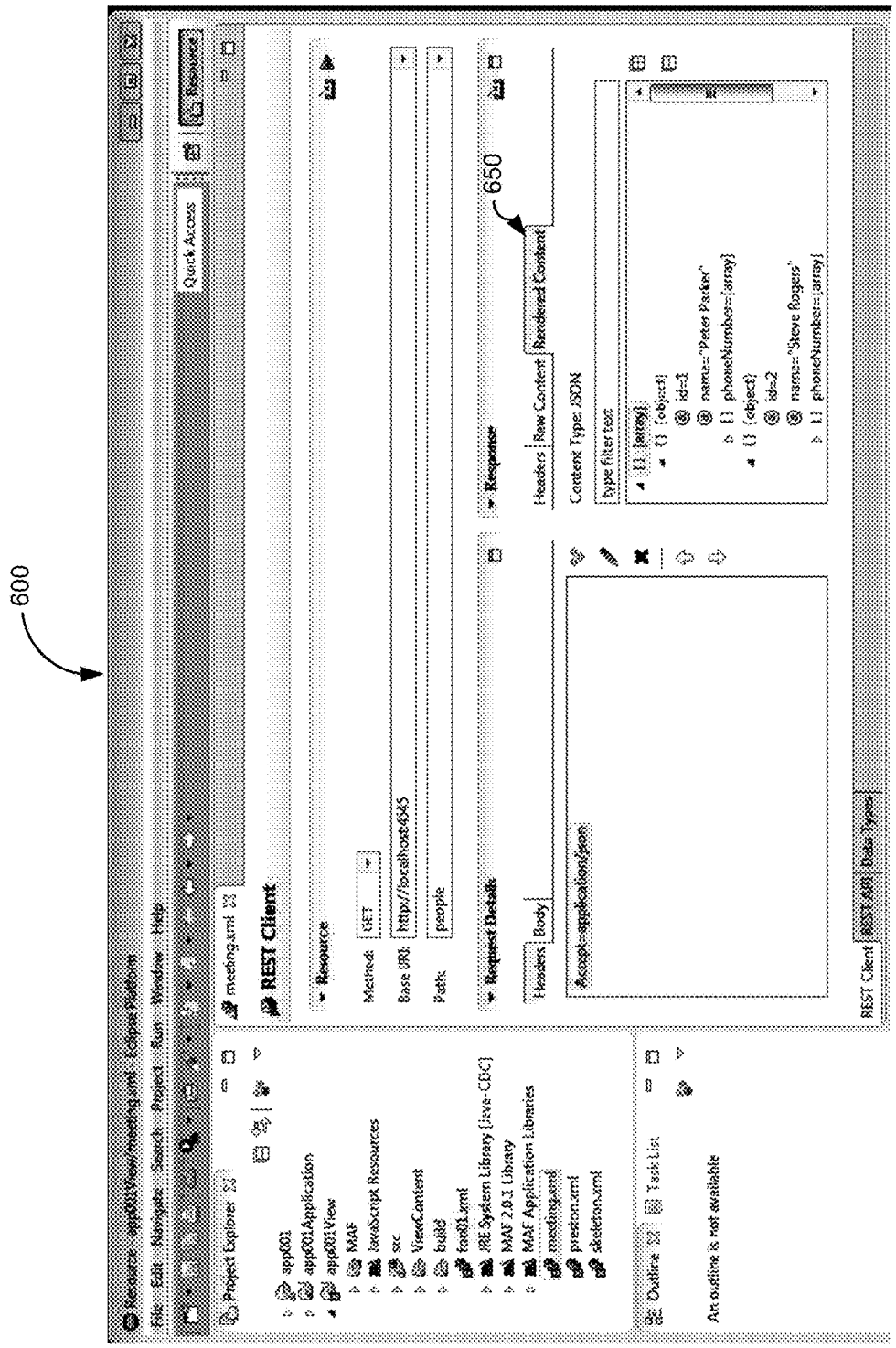
FIG. 7 is an illustration of the user interface of FIG. 6 depicting the parameter-based body specification component in one embodiment.

UI 610 can provide user interface elements for defining parts of a request, such as any URIs, header information (e.g., MIME type or ACCEPT parameters), or body or payload information. UI 610 can provide user interface elements for analyzing parts of a response, such as header information and any associated content. UI 610 simplifies the development process by combining a free text component 640 and a structured rendering component 650 to representing the content of the response. A developer can easily switch back and forth without leaving the tool. FIG. 7 is an illustration of user interface 600 of FIG. 6 depicting structured rendering component 650 in one embodiment. Content can be intelligently rendered according to its specified MIME type, such as the JSON object depicted.

In certain embodiments, IDE 200 allows a developer to create data types usable in an application under development directly within the process of exploring a REST API. As the developer explores the REST API, the structure of content provided in a response from a REST resource can be analyzed and described or otherwise modeled as a data type. UI 630 can provide user interface elements for constructing or defining data types applicable to an application under development using body or payload information received using UI 610.

Figure 8:
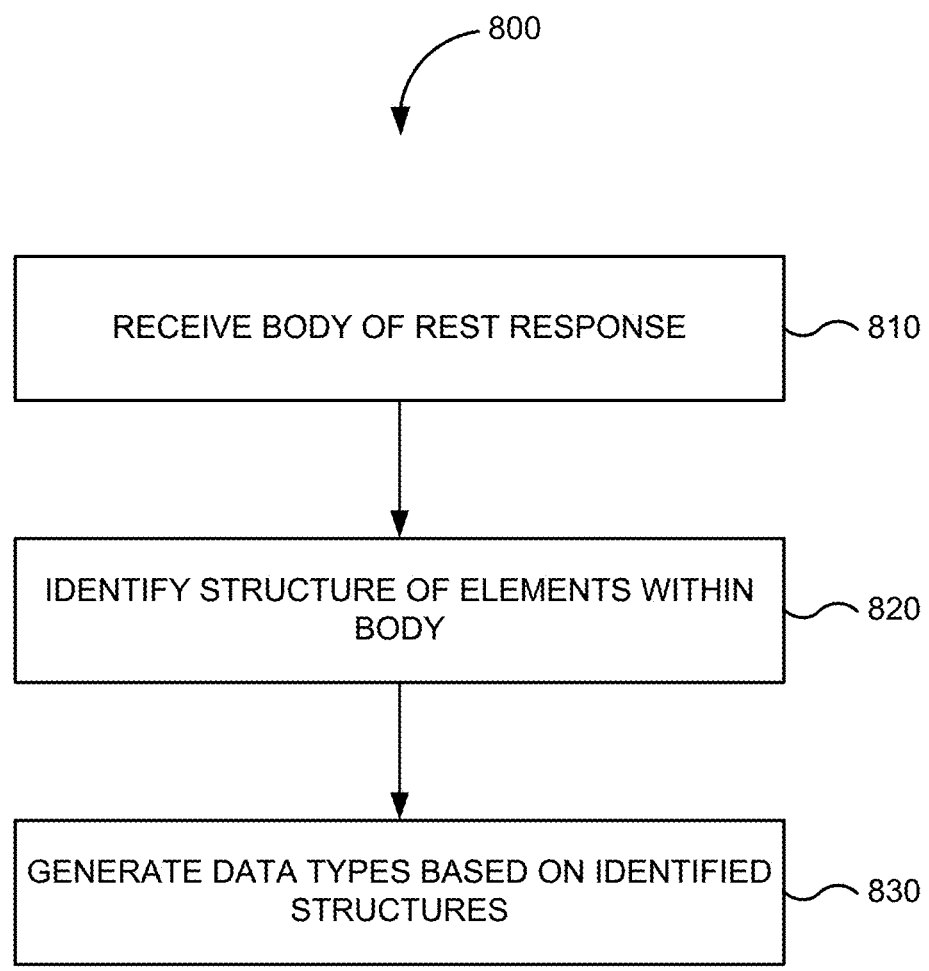
FIG. 8 is a flowchart of a method for generating data types based on exploring a REST API in one embodiment.

FIG. 8 is a flowchart of method 800 for generating data types based on exploring a REST API in one embodiment. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 810, a body of a response is received. The body of a response typically is received as a byte array representing a string. The string may be decoded into ASCII or Unicode text. The string can then be interpreted according to an associated MIME type. In the examples above, the raw string can be interpreted a JSON object. JSON's basic data types are:

Number (a signed decimal number that may contain a fractional part and may use exponential E notation)
String (a sequence of zero or more Unicode characters usually delimited with double-quotation marks)
Boolean (either of the values true or false)
Array (an ordered list of zero or more values, each of which may be of any type, defined using square bracket notation with elements being comma-separated)
Object (an unordered associative array (name/value pairs), delimited with curly brackets and use commas to separate each pair, while within each pair the colon ':' character separates the key or name from its value)
null (an empty value, using the word null)

In step 820, structure of elements within the body is identified. For example, if a content type header of a response indicates that the content of the response has an application/json MIME type, the content can be parsed according to the JSON standards. The basic data types can be identified as well as their associated attributes, values, etc.

In step 830, one or more data types are generated based on the identified structures. Accordingly, in certain embodiments, IDE 200 allows developers to create, define, or otherwise model content of a REST response according to data types applicable to an application under development.

Figure 9:
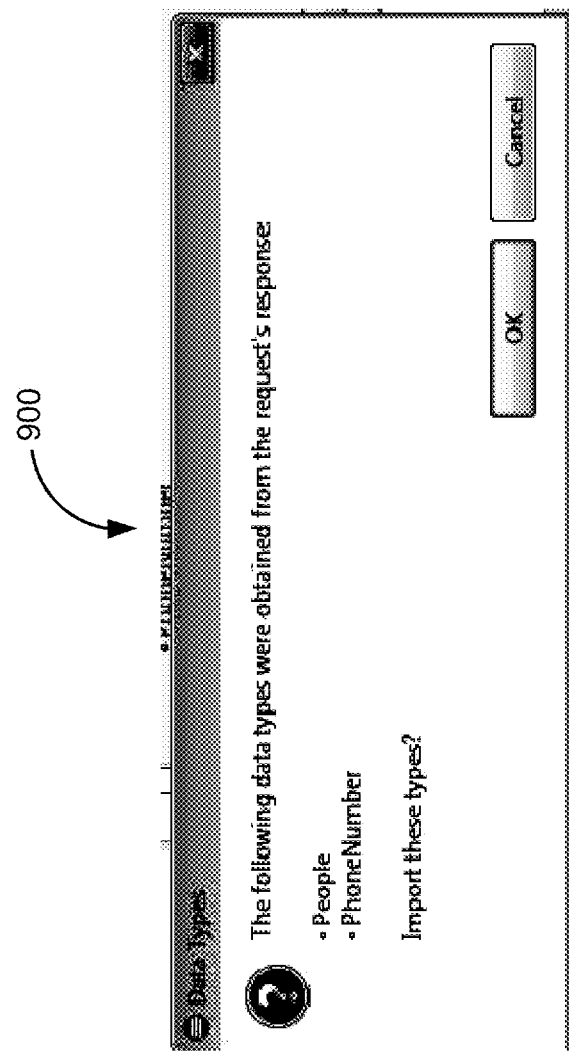
FIG. 9 is an illustration of a dialog informing a user of one or more dynamically detected data types while exploring a REST API in one embodiment.

FIG. 9 is an illustration of a dialog informing a user of one or more dynamically detected data types while exploring a REST API in one embodiment. In various embodiments, an inference engine can apply a set of inference rules to content of a REST response to dynamically determine one or more data types. In FIG. 9, two dynamically determined data types are identified and presented to a developer for importation into a project. If the developer was accessing the "people" URI of a REST resource, IDE 200 can determine that the entirety of the content of a response is of data type "People" using the URI. IDE 200 can dynamically generate a "Person" data type using the structure of the content of the response (e.g., an individual Person object or array of Person objects). IDE 200 can also determine from the structure of the JSON object that the "phoneNumber" attribute is another Object having a "number" attribute. IDE 200 can dynamically generate a "PhoneNumber" data type using the structure of the "phoneNumber" attribute. IDE 200 can also describe or model the "Person" data type using the "PhoneNumber" data type.

Figure 10:
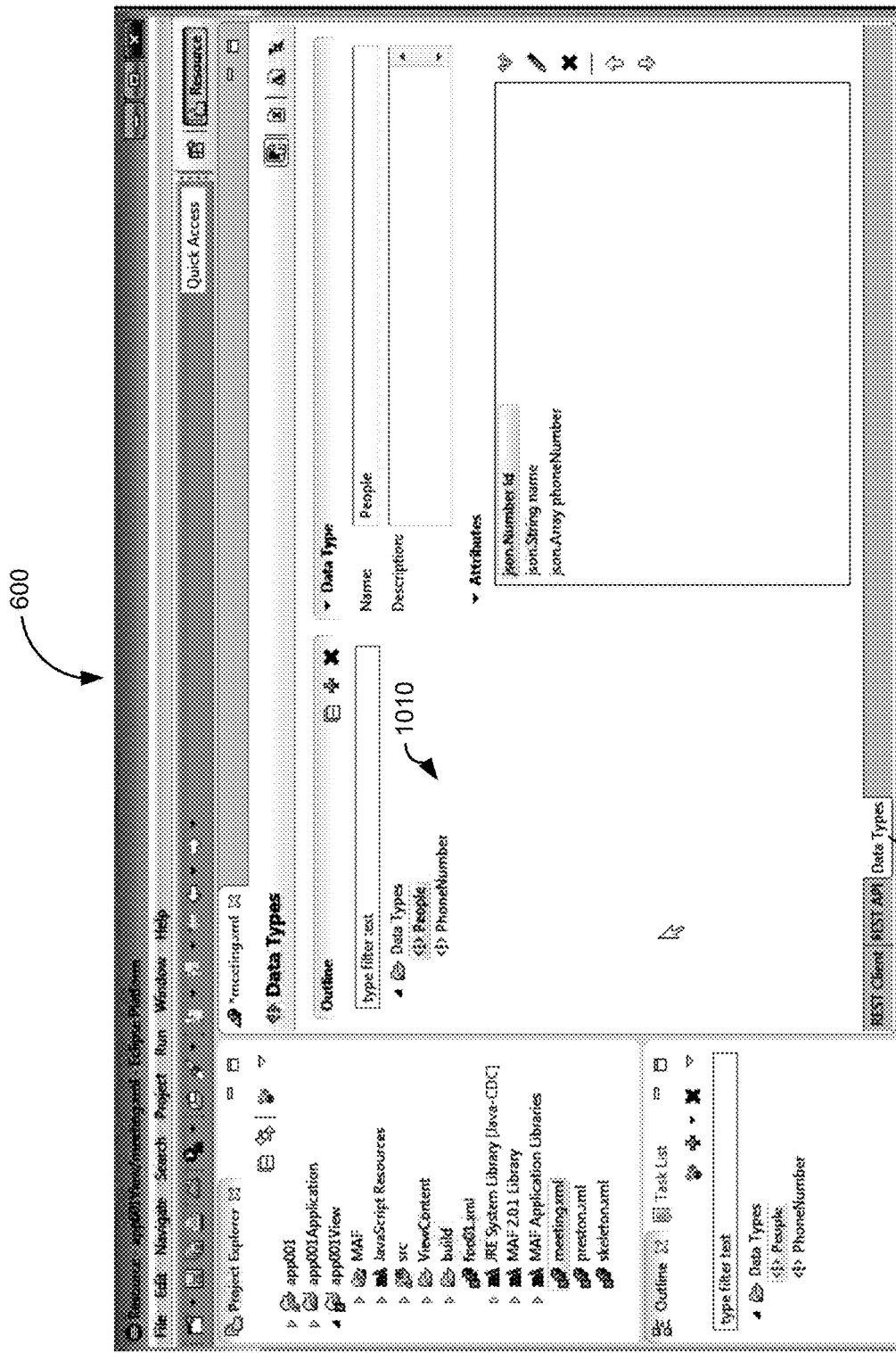
FIG. 10 is an illustration of a user interface that may be presented by a tool of the integrated development environment of FIG. 2 showing dynamically determined data types in one embodiment.

FIG. 10 is an illustration of user interface 600 that may be presented by a tool of the integrated development environment of FIG. 2 showing dynamically determined data types in one embodiment. In this example, UI 630 provides list 1010 of data types that have been created so far in the exploration and modeling of a REST API. UI 630 can provide a representation of the data type, such as a list of attributes indicating how the attribute is derived from a REST response.

Figure 11:
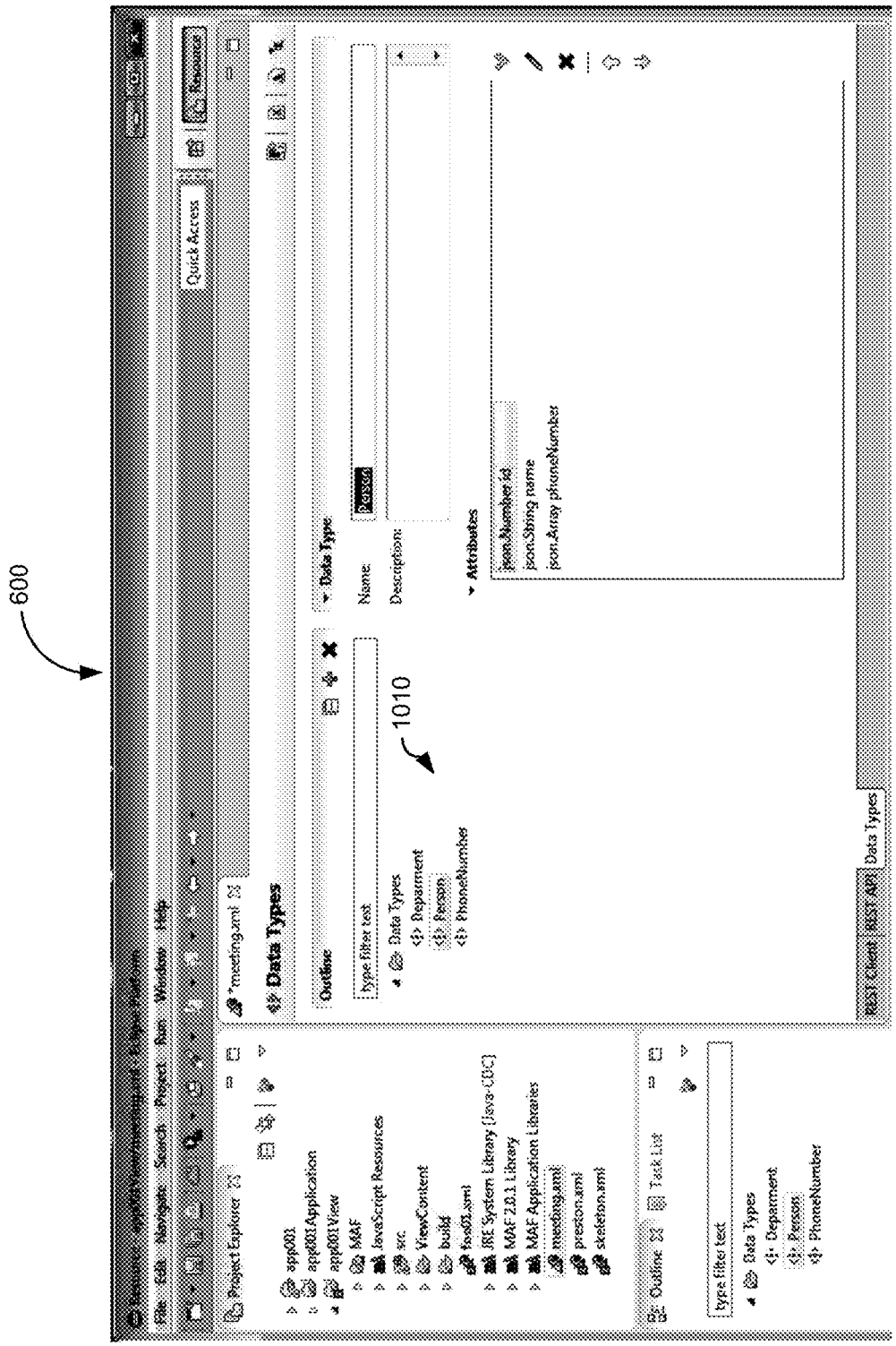
FIG. 11 is an illustration of a user interface that may be presented by a tool of the integrated development environment of FIG. 2 showing user-created data types in one embodiment.

FIG. 11 is an illustration of user interface 600 that may be presented by a tool of the integrated development environment of FIG. 2 showing user-created data types in one embodiment. UI 630 can provide access to a data type creation function allowing a developer to add their own definitions of data types of list 1010 (e.g., "Department").

In certain embodiments, IDE 200 allows a developer to define or model a REST API using the dynamically determined or user-created data types. As the developer explores the REST API, the developer can describe or otherwise model data type. UI 620 of FIG. 6 can provide user interface elements for constructing or defining the REST API (e.g., how to construct a request for a particular resource and what is the response.) using these defined data types. Therefore, an application under development can make use of the REST API using native data types specified by the developer.

Figure 12:
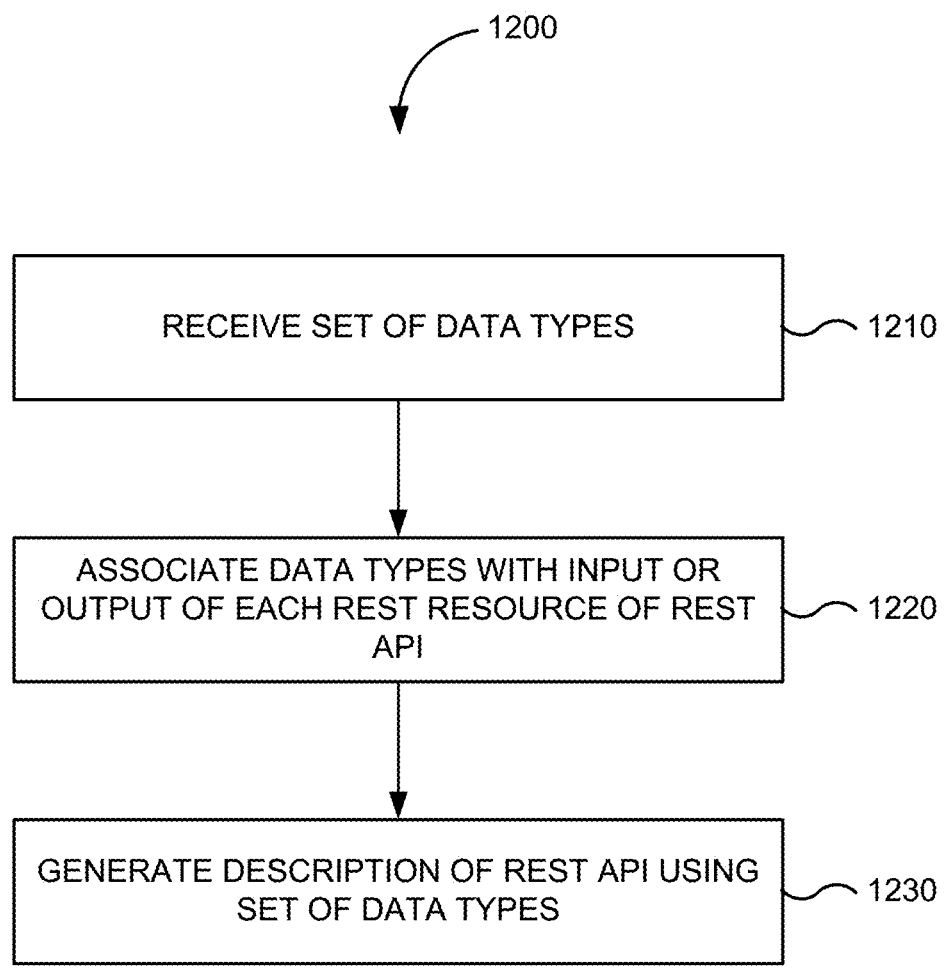
FIG. 12 is a flowchart of a method for describing a REST API using data types based on exploring the REST API in one embodiment.

FIG. 12 is a flowchart of method 1200 for describing a REST API using data types based on exploring the REST API in one embodiment. Implementations of or processing in method 1200 depicted in FIG. 12 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1200 depicted in FIG. 12 begins in step 1210.

In step 1210, a set of data types is received. The data types can be ones dynamically inferred from the content of REST responses or one specifically crafted by a developer to model a REST response as the developer explored the REST API.

In step 1220, one or more data types in the set are associated with an input or output of each REST resource of a REST API. In various embodiments, a developer can model a REST API by defining a request to a REST resource using the data types applicable to an application under development where those data type were dynamically inferred from the content of REST responses or one specifically crafted by a developer to model a REST response as the developer explored the REST API. In step 1230, a description of the REST API is generated using the set of data types.

Figure 13:
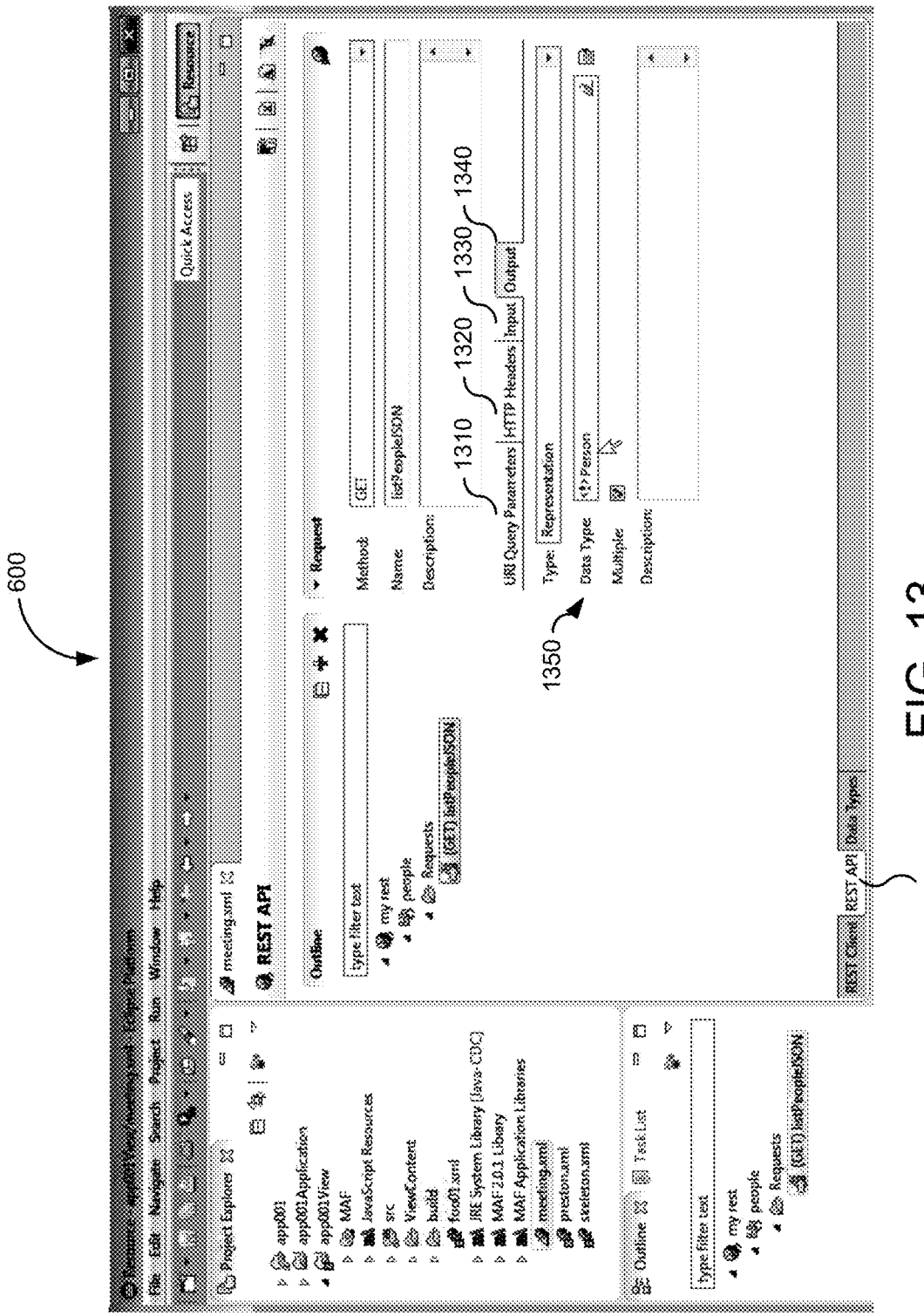
FIG. 13 is an illustration of a user interface that may be presented by a tool of the integrated development environment of FIG. 2 showing a REST API specification in one embodiment.

FIG. 13 is an illustration of user interface 600 that may be presented by a tool of the integrated development environment of FIG. 2 showing a REST API specification in one embodiment. UI 620 can provide access to a REST API modeling function allowing a developer to model the REST API using custom data types. In this example, UI 620 includes URI query parameters component 1310, HTTP headers component 1320, Input component 1330, and Output component 1340.

URI query parameters component 1310 provides access to one or more user interface elements that enable a developer to specify what parameters are used to construct a request to a given REST resource using a specified request method. For example, a resource may be accessed using a GET request method where any information defining the request is specified as query parameters in the form of a query string sent in the URL of the GET request.

HTTP headers component 1320 provides access to one or more user interface elements that enable a developer to specify what header parameters are used to construct a request to a given REST resource using a specified request method. Header parameters can include content type instructions, accept instructions, compression instructions, authentication or authorization instructions, or the like.

Input component 1330 provides access to one or more user interface elements that enable a developer to specify what information is used to construct a request to a given REST resource. Typically, input component 1330 is used to define how the body of a request is generated. A developer can model the input to the request using data types derived (either automatically or manually) while exploring the REST API.

Output component 1340 provides access to one or more user interface elements that enable a developer to specify what information is returned in a response from a given REST resource. Typically, output component 1330 is used to define how the body of a response is to be interpreted. A developer can model the output from the response using data types derived (either automatically or manually) while exploring the REST API.

In this example, data type component 1350 can be used to specify that the output of the given REST resource is of the "Person" data type automatically determined while exploring the REST API using UI 610 and 630.

Figure 14:
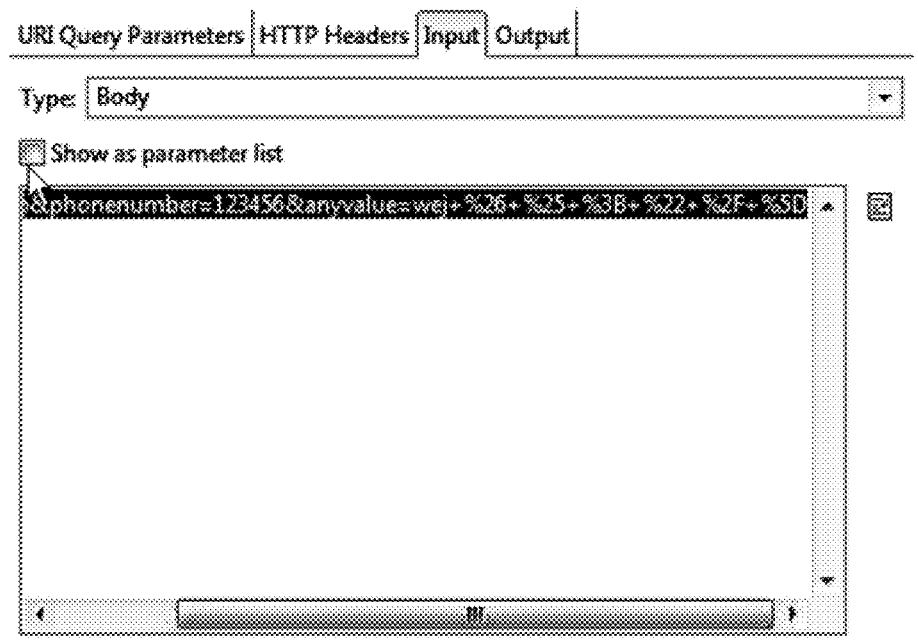
FIG. 14 is an illustration of an input element of the user interface of FIG. 13 showing one manner of representing a REST request in one embodiment.

FIG. 14 is an illustration of an input element of user interface 600 of FIG. 13 showing one manner of representing a REST request in one embodiment. In this example, the input to a REST resource can be specified using a free form string format. A developer may be required to account for any encoding or escaping in order to have the REST resource properly understand the string. In certain embodiments, IDE 200 can automatically maintain any encoding or escaping required based on a specified MIME type (e.g., specified using HTTP headers component 1320).

Figure 15:
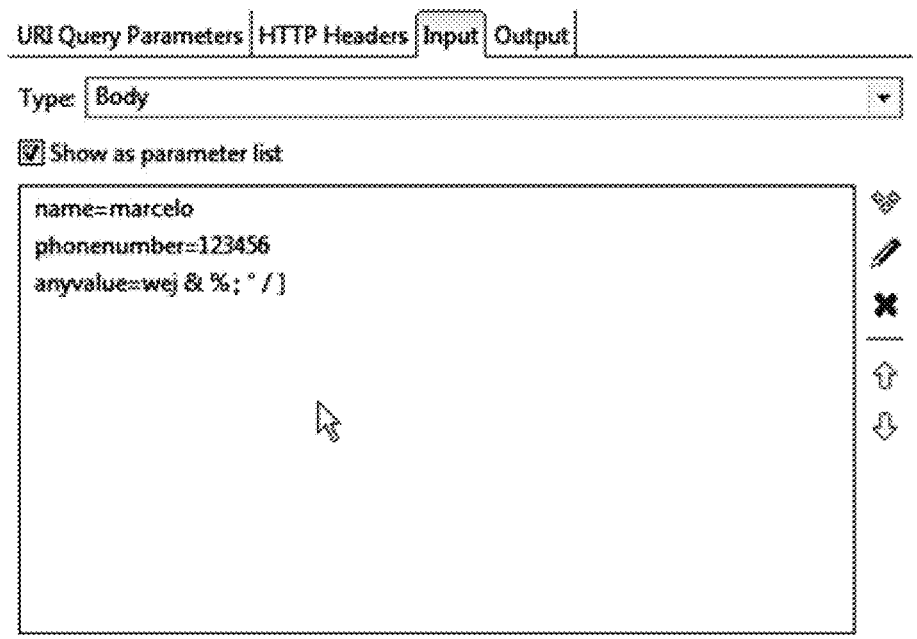
FIG. 15 is an illustration of an input element of the user interface of FIG. 13 showing another manner of representing a REST request in one embodiment.

In certain embodiments, UI 620 maintains the feature of UI 630 enabling a developer to switch between a free form text representation of the input and a parameter set representation of the input. This allows the developer greater flexibility to model the input to the REST resource. IDE 200 can automatically parse, format, translate, and maintain any encoding or escaping required as a developer switches between the two representations. FIG. 15 is an illustration of an input element of user interface 600 of FIG. 13 showing another manner of representing a REST request in one embodiment.

Figure 16:
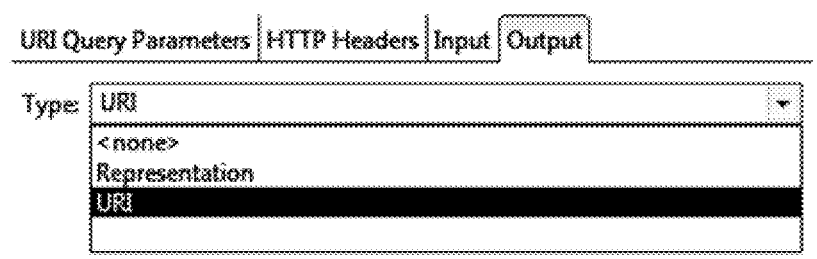
FIG. 16 is an illustration of an output element of the user interface of FIG. 13 showing various manners of representing a REST response in one embodiment.

FIG. 16 is an illustration of an output element of user interface 600 of FIG. 13 showing various manners of representing a REST response in one embodiment. In this example, a developer can switch between a URI representation and a representation that utilizes the custom data types (e.g., as shown in FIG. 13).

Figure 17:
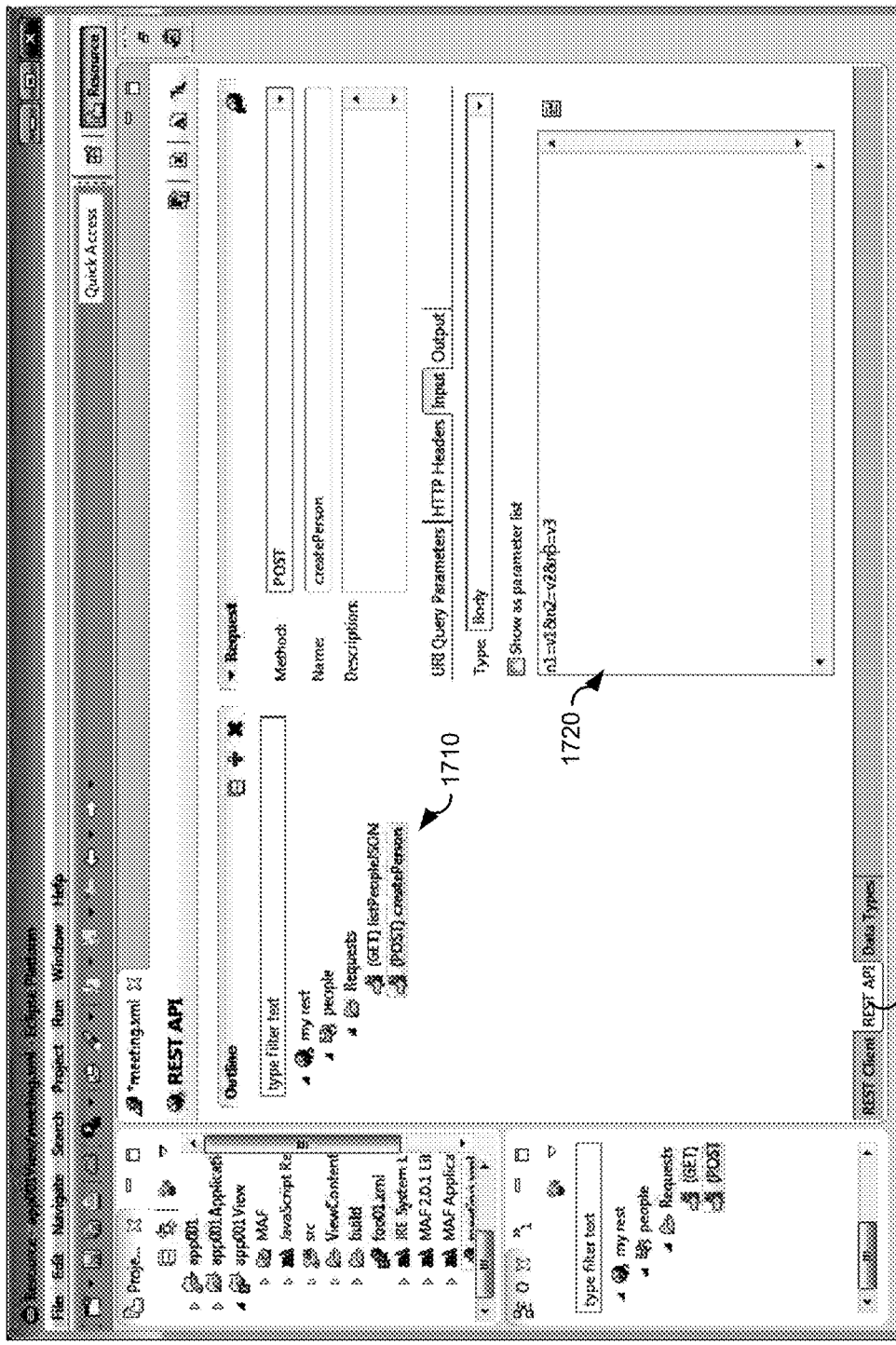
FIG. 17 is an illustration of the user interface of FIG. 13 depicting a REST API specification created by a user in one embodiment.

FIG. 17 is an illustration of user interface 600 of FIG. 13 depicting a REST API specification created by a user in one embodiment. Requests 1710 have been modeled by a developer to include a GET request (and its associated input/output as discussed above) and a POST request. Body 1720 includes a set of parameters in the form a free text that are used to construct request using the POST request method.

Figure 18:
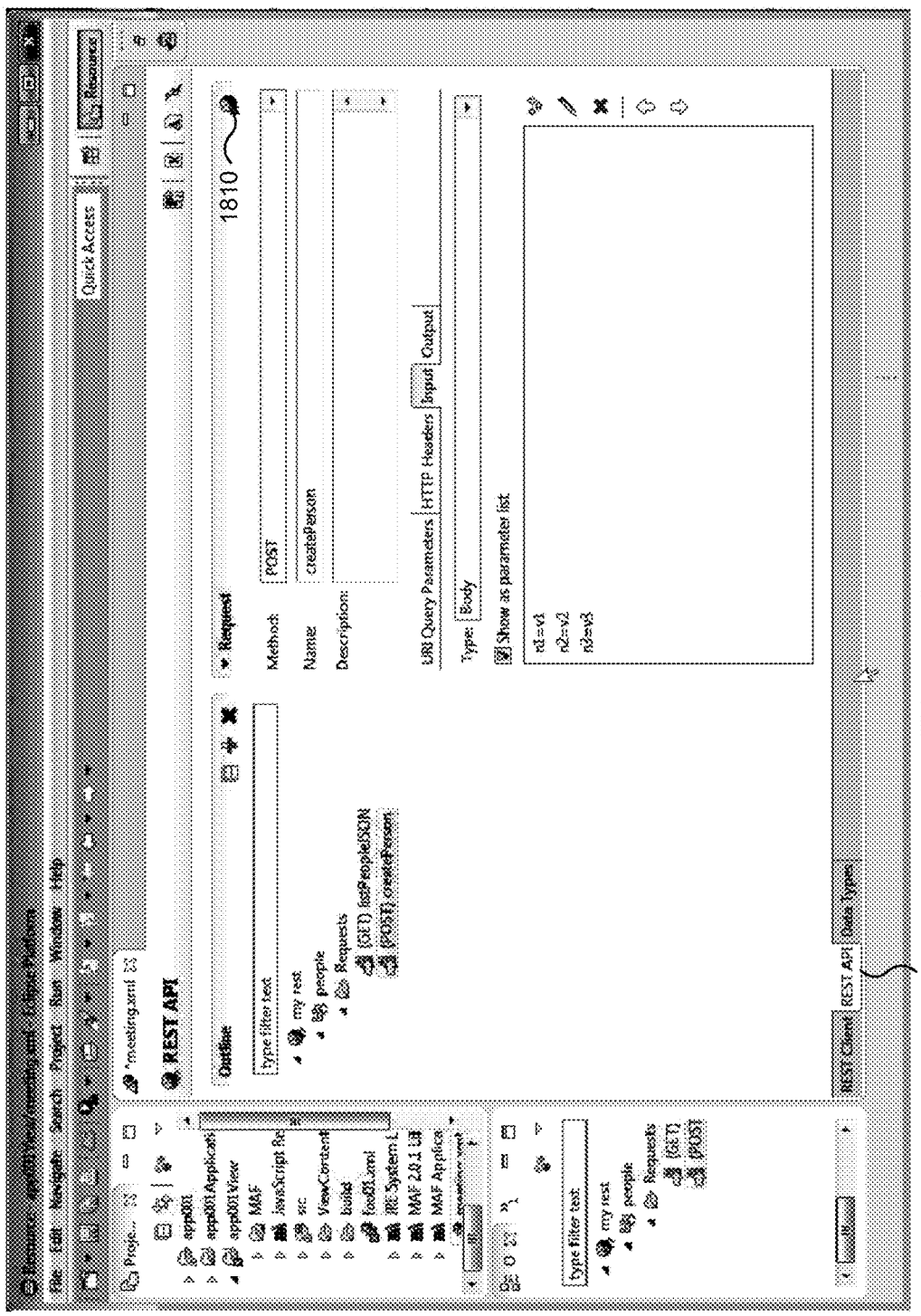
FIG. 18 is an illustration of the user interface of FIG. 13 depicting a test element for testing a REST API specification in one embodiment.

FIG. 18 is an illustration of the user interface of FIG. 13 depicting a test element for testing a REST API specification in one embodiment. Once a developer has modeled a REST API, the developer can test whether any defined requests are generated correctly and whether any responses are property interpreted using button 1810.

Figure 19:
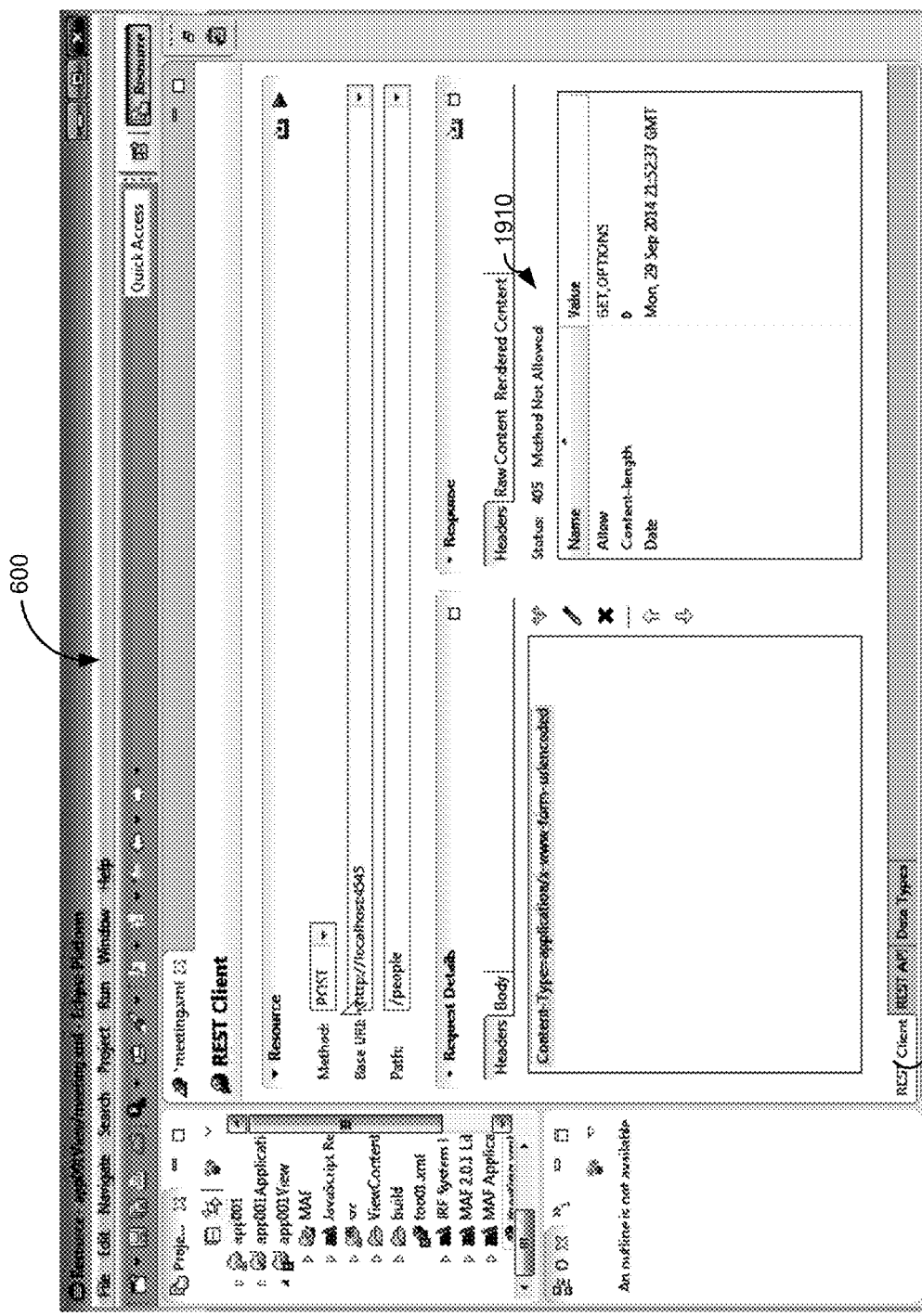
FIG. 19 is an illustration of a user interface that may be presented by a tool of the integrated development environment of FIG. 2 showing results of a test of a REST API specification in one embodiment.

FIG. 19 is an illustration of user interface 600 that may be presented by a tool of the integrated development environment of FIG. 2 showing results of a test of a REST API specification in one embodiment. UI 610 is presented similar to before with the request details and the response details being interpreted according to the modeled REST API under test. In certain embodiments, message 1910 can be provided indicating information useful in the testing and debugging of the modeled REST API.

In certain embodiments, IDE 200 allows a developer to generate artifacts, such as code, classes, interfaces, documentation, or the like using any REST API and data types modeled or defined during the exploration process. As the developer explores the REST API, the developer can describe or otherwise model data types and a REST API. UI 620 of FIG. 6 can provide user interface elements for invoking an artifact generation process using for modeled REST APIs and data types. Therefore, a developer can make use of the modeled REST APIs and data types in a desired programming language with which the application under development has been constructed in IDE 200.

Figure 20:
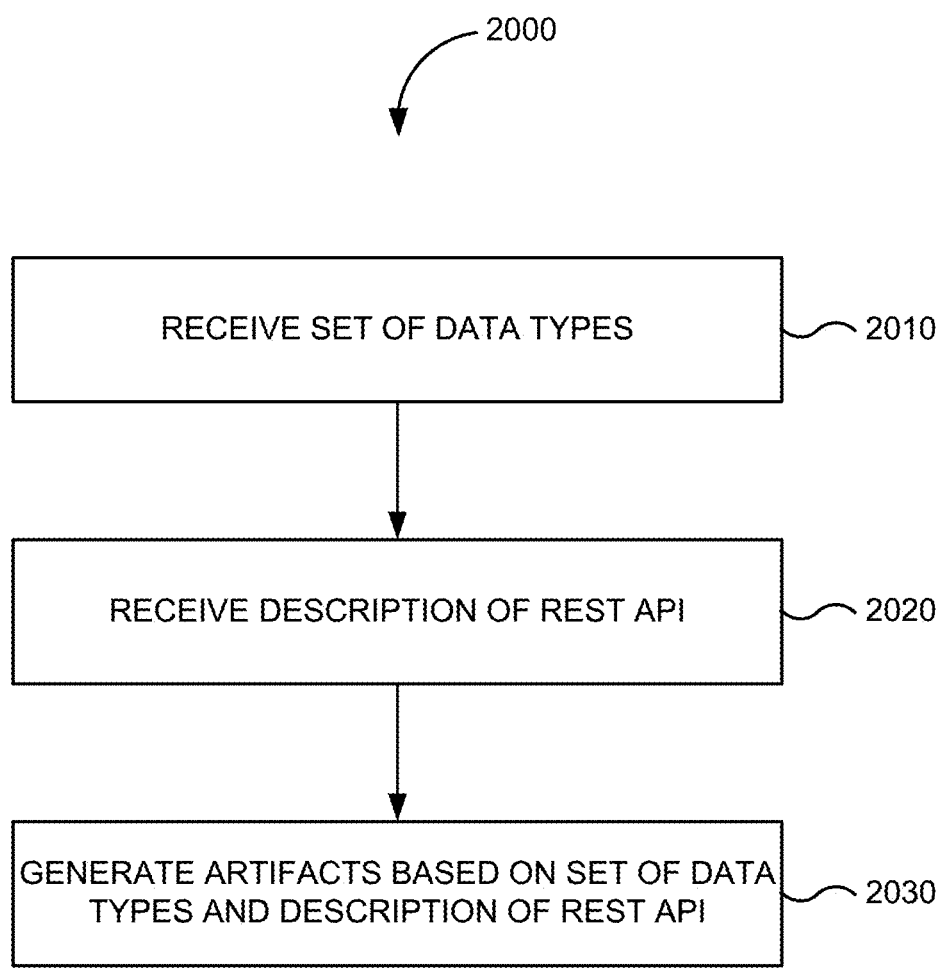
FIG. 20 is a flowchart of a method for generating artifacts from a REST API specification using data types based on exploring and modeling a REST API in one embodiment.

FIG. 20 is a flowchart of method 2000 for generating artifacts from a REST API specification using data types based on exploring and modeling a REST API in one embodiment. Implementations of or processing in method 2000 depicted in FIG. 20 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 2000 depicted in FIG. 20 begins in step 2010.

In step 2010, a set of modeled data types is received. In step 2020, a description of one or more modeled REST APIs is received. In step 2030, one or more artifacts are generated based on the set of data types and the description the one or more modeled REST APIs. As alluded to previously, an artifact can include documentation, code, code segments, header and source files, class or object specifications, or the like. These artifacts can be generated according to the programming language or choice of a developer or according to a project's properties.

Figure 21:
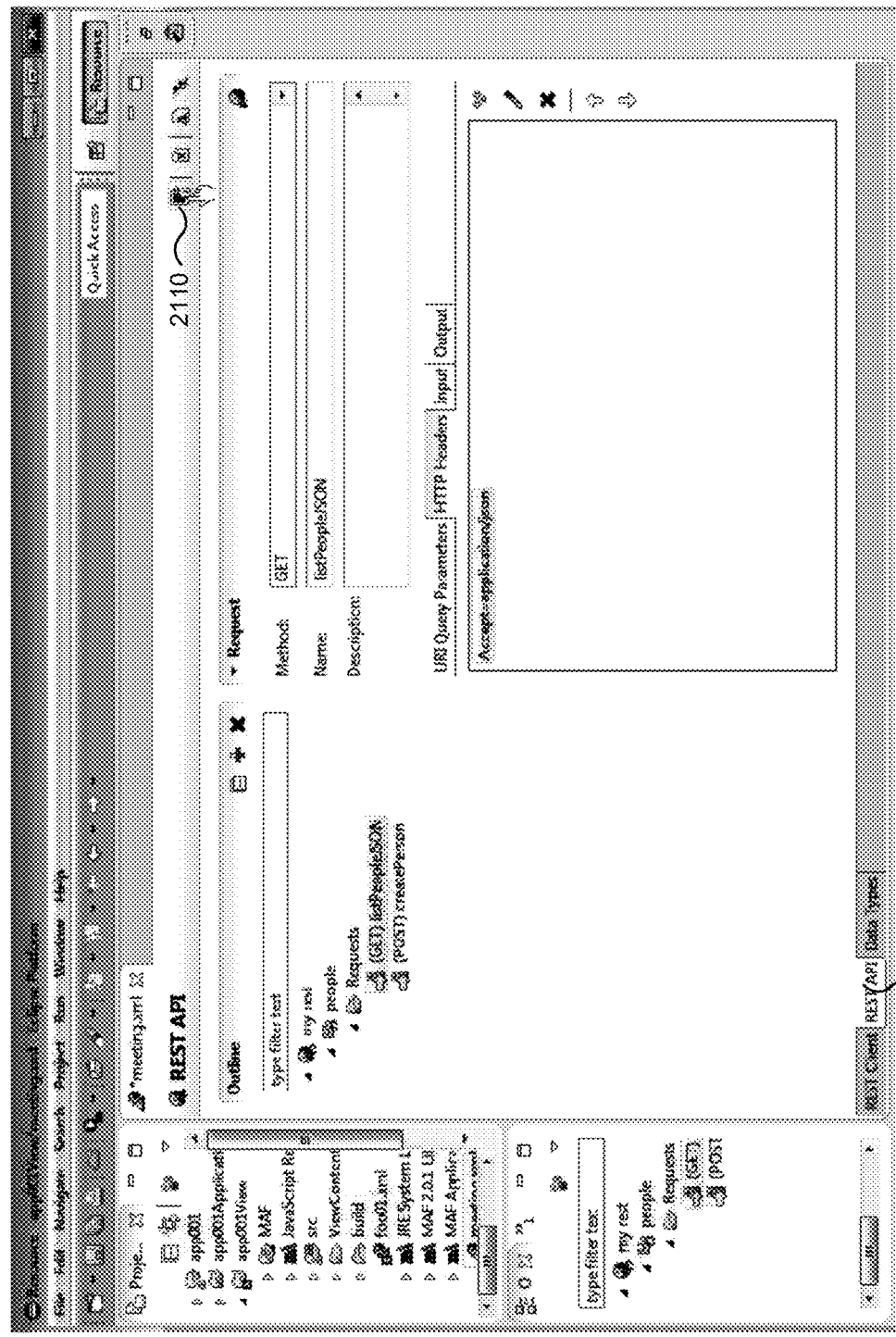
FIG. 21 is an illustration of a user interface that may be presented by a tool of the integrated development environment of FIG. 2 having elements to generate artifacts using a REST API specification in one embodiment.

FIG. 21 is an illustration of a user interface that may be presented by a tool of the integrated development environment of FIG. 2 having elements to generate artifacts using a REST API specification in one embodiment. In this example, button 2110 triggers an artifact generation process.

Figure 22:
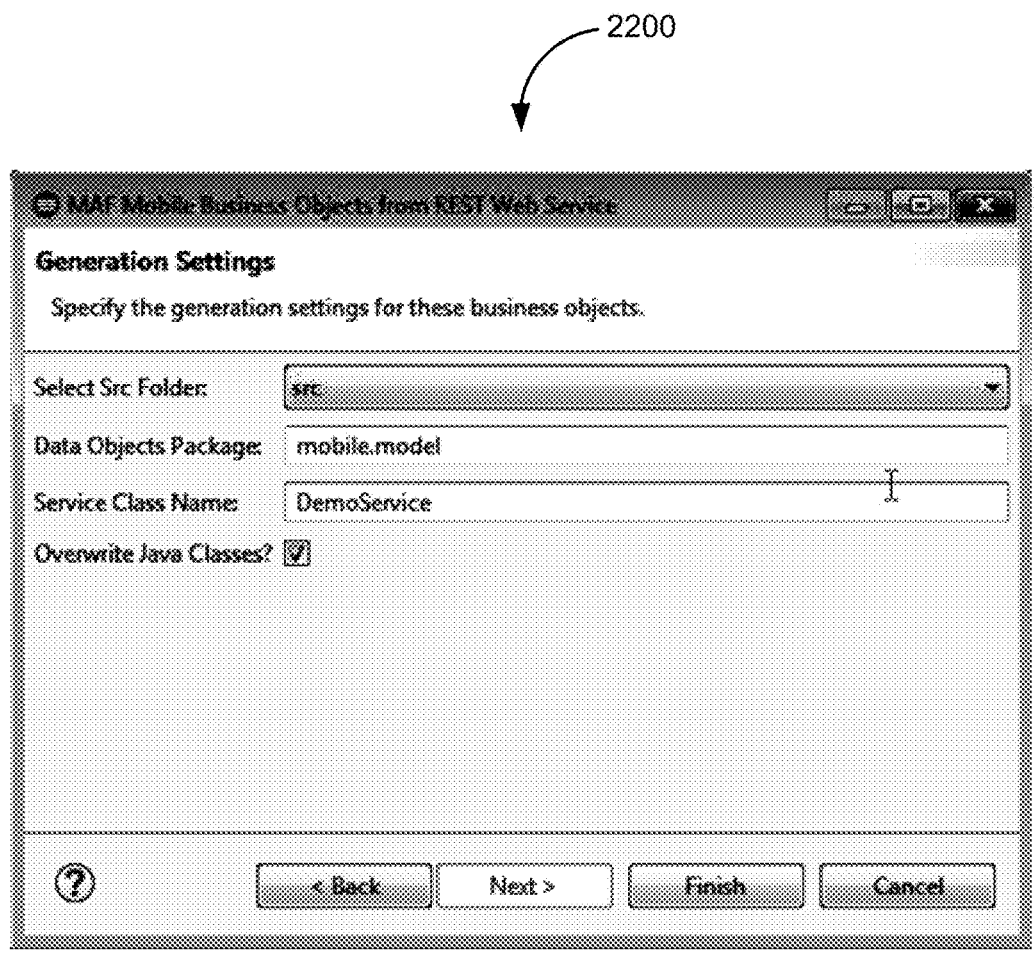
FIG. 22 is an illustration of a dialog requesting parameters for generating artifacts using a REST API specification in one embodiment.

FIG. 22 is an illustration of dialog 2200 requesting parameters for generating artifacts using a REST API specification in one embodiment. A developer can specify the destination of the artifacts, any associated data object packages, a service class name, or the like.

Figure 23:
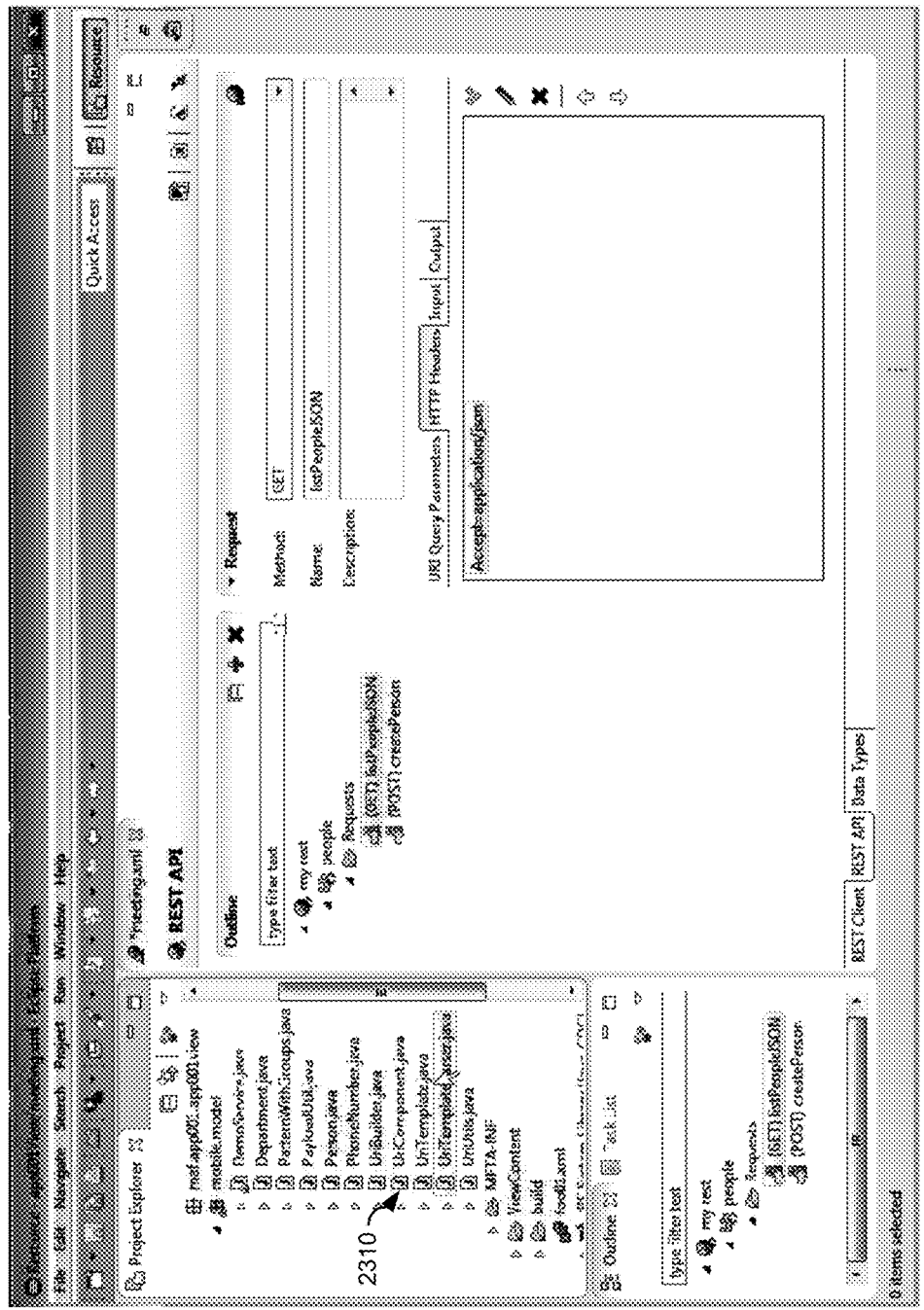
FIG. 23 is an illustration of a user interface that may be presented by a tool of the integrated development environment of FIG. 2 showing artifacts generated using a REST API specification in one embodiment.

FIG. 23 is an illustration of user interface 600 that may be presented by a tool of the integrated development environment of FIG. 2 showing artifacts generated using a REST API specification in one embodiment. A new set of Java source files are now included in panel 2310. Notice that "Person.java" and "PhoneNumber.java" have been created based on how the data types where modeled.

Conclusion

Figure 24:
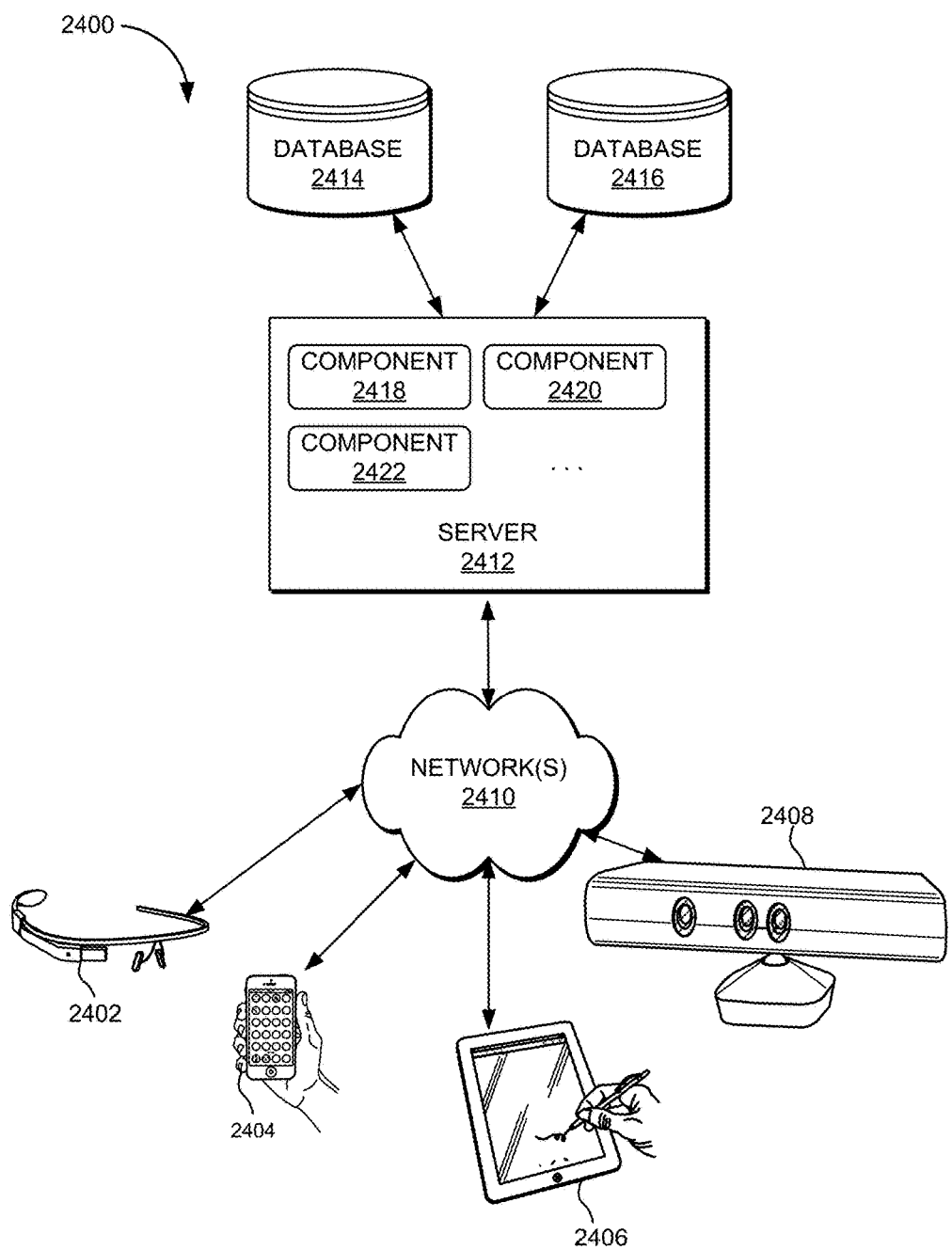
FIG. 24 depicts a simplified diagram of a distributed system for implementing one of the embodiments.

FIG. 24 depicts a simplified diagram of distributed system 2400 for implementing one of the embodiments. In the illustrated embodiment, distributed system 2400 includes one or more client computing devices 2402, 2404, 2406, and 2408, which are configured to execute and operate a client application such as a web browser, proprietary client (e.g., Oracle Forms), or the like over one or more network(s) 2410. Server 2412 may be communicatively coupled with remote client computing devices 2402, 2404, 2406, and 2408 via network 2410.

In various embodiments, server 2412 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 2402, 2404, 2406, and/or 2408. Users operating client computing devices 2402, 2404, 2406, and/or 2408 may in turn utilize one or more client applications to interact with server 2412 to utilize the services provided by these components.

In the configuration depicted in FIG. 24, software components 2418, 2420, and 2422 of system 2400 are shown as being implemented on server 2412. In other embodiments, one or more of the components of system 2400 and/or the services provided by these components may also be implemented by one or more of the client computing devices 2402, 2404, 2406, and/or 2408. Users operating the client computing devices may then utilize one or more client applications to use the services provided by these components. These components may be implemented in hardware, firmware, software, or combinations thereof. It should be appreciated that various different system configurations are possible, which may be different from distributed system 2400. The embodiment shown in the figure is thus one example of a distributed system for implementing an embodiment system and is not intended to be limiting.

Client computing devices 2402, 2404, 2406, and/or 2408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 2402, 2404, 2406, and/or 2408 can be general purpose personal computers including, by way of example, personal computers and/or laptop computers running various versions of Microsoft Windows®, Apple Macintosh®, and/or Linux operating systems. Client computing devices 2402, 2404, 2406, and/or 2408 can be workstation computers running any of a variety of commercially-available UNIX® or UNIX-like operating systems, including without limitation the variety of GNU/Linux operating systems, such as for example, Google Chrome OS. Alternatively, or in addition, client computing devices 2402, 2404, 2406, and 2408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2410.

Although exemplary distributed system 2400 is shown with four client computing devices, any number of client computing devices may be supported. Other devices, such as devices with sensors, etc., may interact with server 2412.

Network(s) 2410 in distributed system 2400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2410 can be a local area network (LAN), such as one based on Ethernet, Token-Ring and/or the like. Network(s) 2410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2412 may be adapted to run one or more services or software applications described in the foregoing disclosure. For example, server 2412 may correspond to a server for performing processing described above according to an embodiment of the present disclosure.

Server 2412 may run an operating system including any of those discussed above, as well as any commercially available server operating system. Server 2412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2412 may include one or more applications to analyze and consolidate data feeds and/or event updates received from users of client computing devices 2402, 2404, 2406, and 2408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2412 may also include one or more applications to display the data feeds and/or real-time events via one or more display devices of client computing devices 2402, 2404, 2406, and 2408.

Distributed system 2400 may also include one or more databases 2414 and 2416. Databases 2414 and 2416 may reside in a variety of locations. By way of example, one or more of databases 2414 and 2416 may reside on a non-transitory storage medium local to (and/or resident in) server 2412. Alternatively, databases 2414 and 2416 may be remote from server 2412 and in communication with server 2412 via a network-based or dedicated connection. In one set of embodiments, databases 2414 and 2416 may reside in a storage-area network (SAN). Similarly, any necessary files for performing the functions attributed to server 2412 may be stored locally on server 2412 and/or remotely, as appropriate. In one set of embodiments, databases 2414 and 2416 may include relational databases, such as databases provided by Oracle, that are adapted to store, update, and retrieve data in response to SQL-formatted commands.

FIG. 25 illustrates an exemplary computer system 2500, in which various embodiments of the present invention may be implemented. The system 2500 may be used to implement any of the computer systems described above. As shown in FIG. 25, computer system 2500 includes bus subsystem 2502 and processing unit 2504 that communicates with a number of peripheral subsystems via bus subsystem 2502. These peripheral subsystems may include processing acceleration unit 2506, I/O subsystem 2508, storage subsystem 2518, and communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor (DSP), a special-purpose processor, and/or the like.

I/O subsystem 2508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that comprises software elements, shown as being currently located within a system memory 2510. System memory 2510 may store program instructions that are loadable and executable on processing unit 2504, as well as data generated during the execution of these programs.

Depending on the configuration and type of computer system 2500, system memory 2510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2504. In some implementations, system memory 2510 may include multiple different types of memory, such as static random access memory (SRAM) or dynamic random access memory (DRAM). In some implementations, a basic input/output system (BIOS), containing the basic routines that help to transfer information between elements within computer system 2500, such as during start-up, may typically be stored in the ROM. By way of example, and not limitation, system memory 2510 also illustrates application programs 2512, which may include client applications, Web browsers, mid-tier applications, relational database management systems (RDBMS), etc., program data 2514, and an operating system 2516. By way of example, operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2518 may also provide a tangible computer-readable storage medium for storing the basic programming and data constructs that provide the functionality of some embodiments. Software (programs, code modules, instructions) that when executed by a processor provide the functionality described above may be stored in storage subsystem 2518. These software modules or instructions may be executed by processing unit 2504. Storage subsystem 2518 may also provide a repository for storing data used in accordance with the present invention.

Storage subsystem 2500 may also include a computer-readable storage media reader 2520 that can further be connected to computer-readable storage media 2522. Together and, optionally, in combination with system memory 2510, computer-readable storage media 2522 may comprehensively represent remote, local, fixed, and/or removable storage devices plus storage media for temporarily and/or more permanently containing, storing, transmitting, and retrieving computer-readable information.

Computer-readable storage media 2522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2500.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2524 may also be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
   receiving, at a computer, a Hypertext Transport Protocol (HTTP) response to a user exploring a Representational State Transfer (REST) resource using a first function of a tool of an integrated development environment;
   determining, by the computer, content from the HTTP response;
   identifying a structure of one or more elements in the content;
   receiving, at the computer, an indication that the user is modeling the content using a second function of the tool;
   generating, by an inference engine of the computer, one or more data types of the content by applying a set of inference rules to at least one of the one or more elements in the content;
   presenting, in a user interface of the computer, the one or more data types to the user;
   receiving, via the user interface of the computer, a selection of at least a subset of the one or more data types; and
   dynamically generating, by the computer, one or more new data types for the integrated development environment based on the selected subset of the one or more data types using a third function of the tool, wherein at least one of the one or more new data types is usable by the user of the integrated development environment to generate code.

2. The method of claim 1 wherein receiving, at the computer, the content comprises receiving the content in response to the user using a REST client of the tool.

3. The method of claim 1 wherein receiving, at the computer, the content in response to the user exploring the REST resource using the tool of the integrated development environment comprises receiving a representation of the object.

4. The method of claim 1 wherein receiving, at the computer, the content in response to the user exploring the REST resource using the tool of the integrated development environment comprises receiving a set of attribute-value pairs.

5. The method of claim 1 further comprising:
   receiving, at the computer, a Uniform Resource Identifier (URI) associated with the REST resource;
   receiving, at the computer, a request method with the REST resource;
   sending, by the computer, a Hypertext Transport Protocol (HTTP) request created using the URI associated with the REST resource to a server using the request method;
   receiving, at the computer, a HTTP response from the server; and
   determining, by the computer, the content from the HTTP response.

6. The method of claim 5 wherein the content comprises a set of headers and a body payload.

7. The method of claim 1 wherein receiving, at the computer, the one or more data types comprises receiving the one or more data types in response to input from the user.

8. The method of claim 1 wherein determining the one or more data types comprises matching a portion of the content to one or more predetermined data types.

9. The method of claim 1, wherein generating the data type based on the structure of the at least one of the one or more elements in the content comprises generating a data type that represents the entire HTTP response.

10. The method of claim 1, wherein generating the data type based on the structure of the at least one of the one or more elements in the content comprises generating a data type that represents an attribute of a representation of the object.

11. The method of claim 1 further comprising receiving, at the computer, a description of a REST Application Programming Interface (API) associated with the REST resource in response to a user defining the REST API according to the one or more data types using a fourth function of the tool.

12. The method of claim 11 further comprising:
    receiving, at the computer, information specifying input needed to generate a HTTP request to access the REST resource, the input being defined using at least one of the one or more data types.

13. The method of claim 11 further comprising:
    receiving, at the computer, information specifying output of the REST resource, the output being defined using at least one of the one or more data types.

14. The method of claim 11 further comprising generating the description of the REST API using the one or more data types.

15. The method of claim 1 wherein generating, by the computer, the one or more artifacts comprises generated documentation describing a data type.

16. The method of claim 1 wherein generating, by the computer, the one or more artifacts comprises generating application code representative of a data type.

17. The method of claim 16 wherein generating the application code representative of the data type comprise generating Java source code defining a class that implements the data type.

18. A non-transitory computer-readable medium storing a computer program product which when executed by one or more processors associated with one or more computer systems causes the one or more processors to perform operations comprising:
    receiving a Hypertext Transport Protocol (HTTP) response to a user exploring a Representational State Transfer (REST) resource using a first function of a tool of an integrated development environment;
    determining content from the HTTP response;
    identifying a structure of one or more elements in the content;
    receiving an indication that the user is modeling the content using a second function of the tool;

generating, by an inference engine, one or more data types of the content by applying a set of inference rules to at least one of the one or more elements in the content;

presenting, in a user interface, the one or more data types to the user;

receiving, via the user interface, a selection of at least a subset of the one or more data types; and dynamically generating one or more new data types for the integrated development environment based on the selected subset of the one or more data types using a third function of the tool, wherein at least one of the one or more new data types is usable by the user of the integrated development environment to generate code.

19. A system having one or more hardware processors and a memory storing a set of instructions which when executed by the one or more processors cause the one or more processors to:

receive a Hypertext Transport Protocol (HTTP) response to a user exploring a Representational State Transfer (REST) resource using a first function of a tool of an integrated development environment;

determine content from the HTTP response;

identify a structure of one or more elements in the content;

receive an indication that the user is modeling the content using a second function of the tool;

generate, by an inference engine, one or more data types of the content by applying a set of inference rules to at least one of the one or more elements in the content;

present, in a user interface, the one or more data types to the user;

receive, via the user interface, a selection of at least a subset of the one or more data types; and dynamically generate one or more new data types for the integrated development environment based on the selected subset of the one or more data types using a third function of the tool, wherein at least one of the one or more new data types is usable by the user of the integrated development environment to generate code.

* * * * *